United States Patent
Liebig

(10) Patent No.: US 6,497,102 B2
(45) Date of Patent: Dec. 24, 2002

(54) METHOD FOR SUPPLEMENTING A SATURATED STEAM GENERATION SYSTEM HAVING AT LEAST ONE STEAM TURBINE SET, AND STEAM POWER PLANT SUPPLEMENTED USING THE METHOD

(75) Inventor: Erhard Liebig, Laufenburg (DE)

(73) Assignee: ALSTOM (Switzerland) Ltd, Baden (CH)

( * ) Notice: Subject to any disclaimer, the term of this patent is extended or adjusted under 35 U.S.C. 154(b) by 10 days.

(21) Appl. No.: 09/733,081

(22) Filed: Dec. 11, 2000

(65) Prior Publication Data

US 2001/0004829 A1 Jun. 28, 2001

(30) Foreign Application Priority Data

Dec. 23, 1999 (DE) .......................... 199 62 386

(51) Int. Cl.⁷ .............................. F02C 6/00; G21D 5/00
(52) U.S. Cl. ................ 60/772; 60/39.182; 60/644.1; 60/679
(58) Field of Search .............................. 60/772, 39.182, 60/676, 679, 644.1; 122/7 B

(56) References Cited

U.S. PATENT DOCUMENTS

| 5,457,721 | A | * | 10/1995 | Tsiklauri et al. | ........... 60/644.1 |
| 5,526,386 | A | * | 6/1996 | Tsiklauri et al. | ........... 60/644.1 |
| 5,582,011 | A | * | 12/1996 | Bronicki et al. | ........... 60/641.5 |
| 5,727,379 | A | * | 3/1998 | Cohn | ...................... 60/39.182 |

* cited by examiner

*Primary Examiner*—Ted Kim
(74) *Attorney, Agent, or Firm*—Burns, Doane, Swecker & Mathis, L.L.P.

(57) ABSTRACT

A saturated steam generation system is supplemented with at least one gas turbine set, at least one heat recovery steam generator, at least one topping steam turbine and at least one steam mixing component. The topping steam turbine is coupled to the gas turbine set and is supplied by the steam generated in the heat recovery steam generator. The exhaust steam from the topping steam turbine is fed via the steam mixing component to the steam turbine set.

3 Claims, 24 Drawing Sheets

Figure 1:
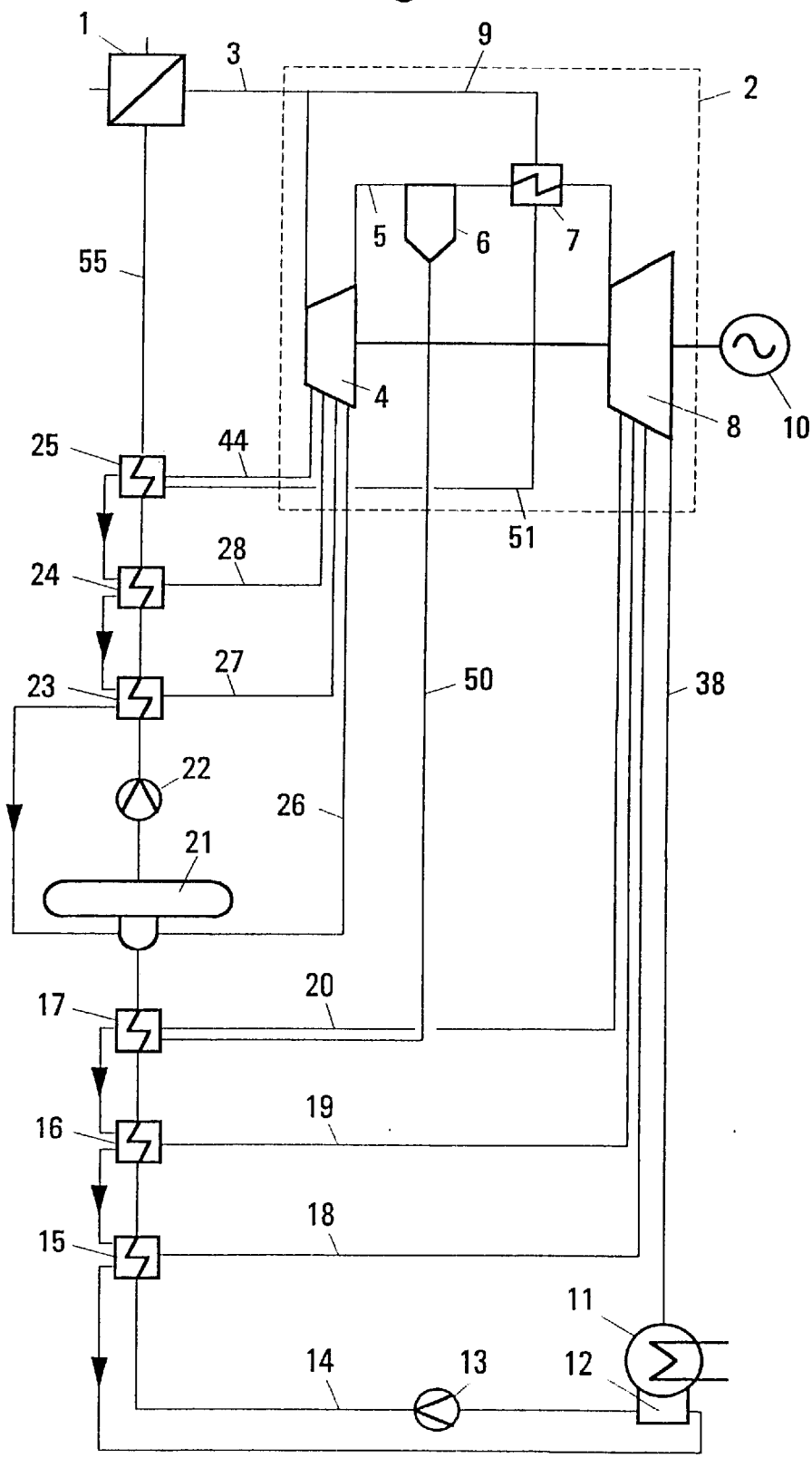

METHOD FOR SUPPLEMENTING A SATURATED STEAM GENERATION SYSTEM HAVING AT LEAST ONE STEAM TURBINE SET, AND STEAM POWER PLANT SUPPLEMENTED USING THE METHOD

This application claims priority under 35 U.S.C. §§119 and/or 365 to application Ser. No. 199 62 386,4 filed in Germany on Dec. 23, 1999; the entire content of which is hereby incorporated by reference.

FIELD OF THE INVENTION

The present invention relates to a method for supplementing a saturated steam generation system having at least one steam turbine set in a steam power plant which is designed for high live steam parameters. It also relates to a steam power plant supplemented using this method.

BACKGROUND OF THE INVENTION

For various reasons, the state of a steam generator may change, in particular after a prolonged operating period, in such a way that the steam generator can only continue to be operated at reduced output or with changed parameters.

For example, it is possible that the output or specified parameters of a steam generator will not be reached because of the heating surfaces being highly contaminated by deposits.

Particularly in a nuclear power plant, components in the nuclear area are additionally aged by the exposure to radiation. Furthermore, nuclear technology is the subject of intense political discussion, which may cause the statutory framework conditions to change. One consequence may be that it is no longer possible or permissible for the reactor to be operated at its full power density, and as a result the output from the steam generation will fall, the flexibility of the plant will be restricted and the like.

If a steam generator has to be operated at reduced output, and the water/steam cycle and therefore the steam turbine set of the power plant are no longer fully loaded, restrictions arise with regard to the operating methods which were originally permitted and the like. The result is losses in the electric power generated, i.e. financial losses for the operator, for example, of the power plant.

When supplementing saturated steam generation systems of reduced output having steam turbine sets, the supplementing procedure at the same time aims to modernize the installation by raising the steam parameters in order to increase both the output and the efficiency of the overall power plant, comprising the saturated steam generation system and the steam turbine sets.

SUMMARY OF THE INVENTION

The invention is therefore based on the object of providing a method for supplementing a saturated steam generation system having at least one steam turbine set, according to which, while the original plant technology is maintained, the at least one steam turbine set can continue to be as fully loaded as possible with a reduced output from the saturated steam generation system.

This supplementing process is advantageously to lead to the output being increased but also, at the same time, to the efficiency of the entire steam power plant being increased.

The invention is to be suitable in particular for supplementing a nuclear saturated steam generation system having at least one steam turbine set.

In a first embodiment of the method, this is achieved, according to the invention, in that the saturated steam generation system is supplemented with at least one gas turbine set, at least one heat recovery steam generator, at least one topping steam turbine and at least one steam mixing component, the exhaust gas from the at least one gas turbine of the at least one gas turbine set is utilized for steam generation in the at least one heat recovery steam generator, the steam which is generated in the at least one heat recovery steam generator is fed via a live steam line to the at least one topping steam turbine, and the exhaust steam from the at least one topping steam turbine is fed via an exhaust steam line to the at least one steam mixing component, in which at least one steam mixing component steam originating from the saturated steam generation system is mixed with steam originating from the at least one topping steam turbine, and the steam mixture is provided to the at least one steam turbine set. The exhaust steam states of the at least one topping steam turbine are within the ranges which are permissible for operation of the at least one steam turbine set.

In a second embodiment of the method, the at least one steam turbine set has a saturated steam intermediate pressure steam turbine, a separator, a reheater and a low pressure steam turbine, and the at least one heat recovery steam generator has a reheater. The exhaust steam from the saturated steam intermediate pressure steam turbine of the at least one steam turbine set is at least in part reheated on the mass flow side in the reheater of the at least one heat recovery steam generator, and the reheated steam is provided to the at least one steam turbine set.

In a third embodiment of the method, the at least one topping steam turbine has a high pressure part and an intermediate pressure part, and the at least one heat recovery steam generator has a reheater. The exhaust steam from the high pressure part of the at least one topping steam turbine is reheated in the reheater of the at least one heat recovery steam generator and, after the reheating, is fed to the intermediate pressure part of the at least one topping steam turbine. The exhaust steam from the intermediate pressure part of the at least one topping steam turbine is fed via the exhaust steam line to the at least one steam mixing component of the at least one steam turbine set.

A steam power plant which has been supplemented according to a first embodiment of a plant for carrying out the method, which plant has a saturated steam generation system and at least one steam turbine set which is supplied with steam by this system, is distinguished by at least one gas turbine set, at least one heat recovery steam generator, at least one topping steam turbine and at least one steam mixing component, which steam mixing component is in communication on the inlet side with the saturated steam generation system and with the at least one topping steam turbine and on the outlet side with at least one part of the steam turbine set.

According to a second embodiment of the plant for carrying out the method, which plant has a saturated steam generation system and at least one steam turbine set, the plant is distinguished by the fact that the at least one heat recovery steam generator has a reheater and the at least one steam turbine set has a saturated steam intermediate pressure steam turbine, a separator, a reheater and a low pressure steam turbine, at least one steam mixing component is arranged between the saturated steam generation system and the at least one steam turbine set, which component is in communication on the inlet side with the saturated steam generation system and the at least one topping steam turbine and on the outlet side with the at least one steam turbine set, which saturated steam intermediate pressure steam turbine is in communication, via a cold reheat steam line, with the reheater of the at least one heat recovery steam generator, from which there leads a hot reheat steam line which runs to the at least one low pressure steam turbine.

According to a third embodiment of the plant for carrying out the method, which plant has a saturated steam generation system and at least one steam turbine set, this plant is distinguished by the fact that the at least one heat recovery steam generator has a reheater, and the at least one topping steam turbine has a high pressure part and an intermediate pressure part, the high pressure part being connected on the exhaust steam side, via a cold reheat steam line, to the reheater of the at least one heat recovery steam generator, the hot reheat line of which is connected to the intermediate pressure part of the at least one topping steam turbine, the exhaust steam line of which is in communication with at least one part of the steam turbine set.

Once the supplementing is complete, the plant comprises at least two independent generator units, having
    different dynamic performance
    different efficiencies of energy generation, and
    if appropriate different fuels and fuel prices.

As a result, there is further freedom in terms of the operating method and the economics of the plant.

The advantages of the invention are that, despite a reduced output from the saturated steam generation system, the existing steam turbine set, which is designed for saturated steam conditions, can continue to be operated under full load, and the overall output and efficiency of the power plant can be increased. In addition, the flexibility of the power plant rises through having two independent generator units. Particularly for nuclear power plants, the result is a plant which involves minimal investment.

Furthermore, particularly in the case of a nuclear power plant, it is possible for the nuclear part of the power plant and the gas turbine part to operate independently. In addition, the power plant represents a first stage of conversion from a nuclear power plant to a combined-cycle power plant, with the aim of subsequently shutting down the nuclear part.

BRIEF DESCRIPTION OF THE INVENTION

Exemplary embodiments of the invention are illustrated in the figures.

Only those elements which are essential to gain an understanding of the invention are shown.

Figure 2:
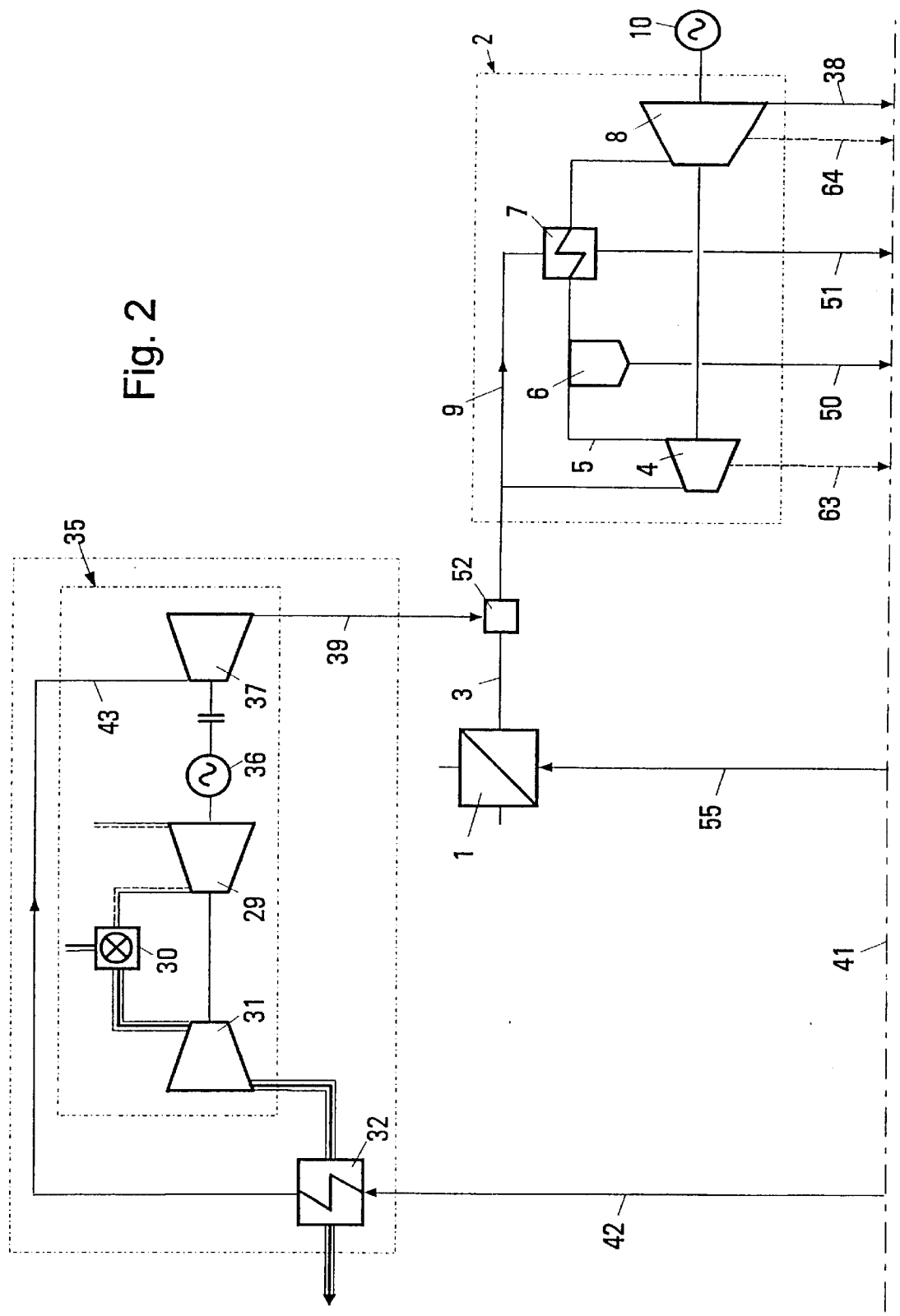
Figure 3:
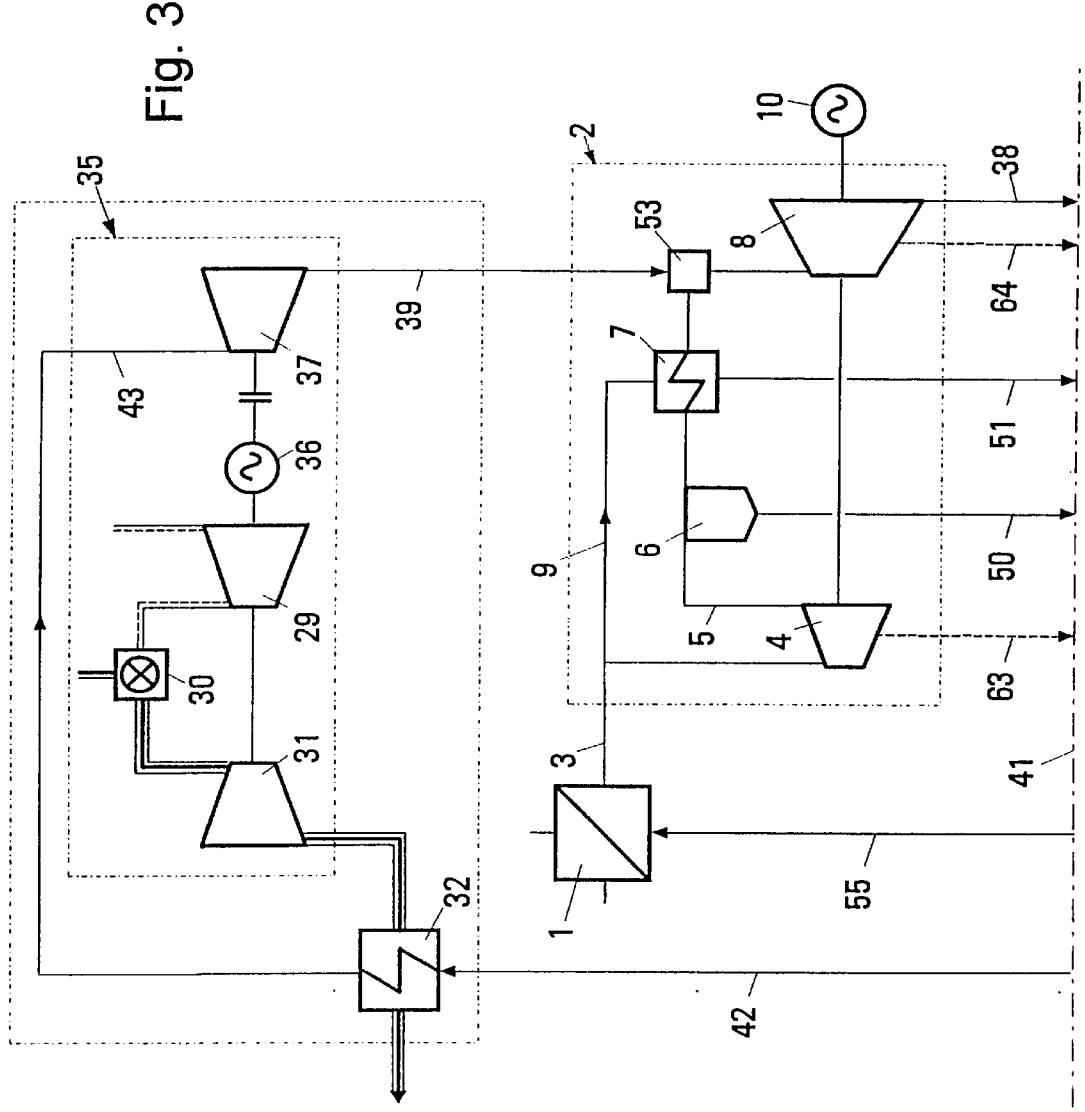
Figure 4:
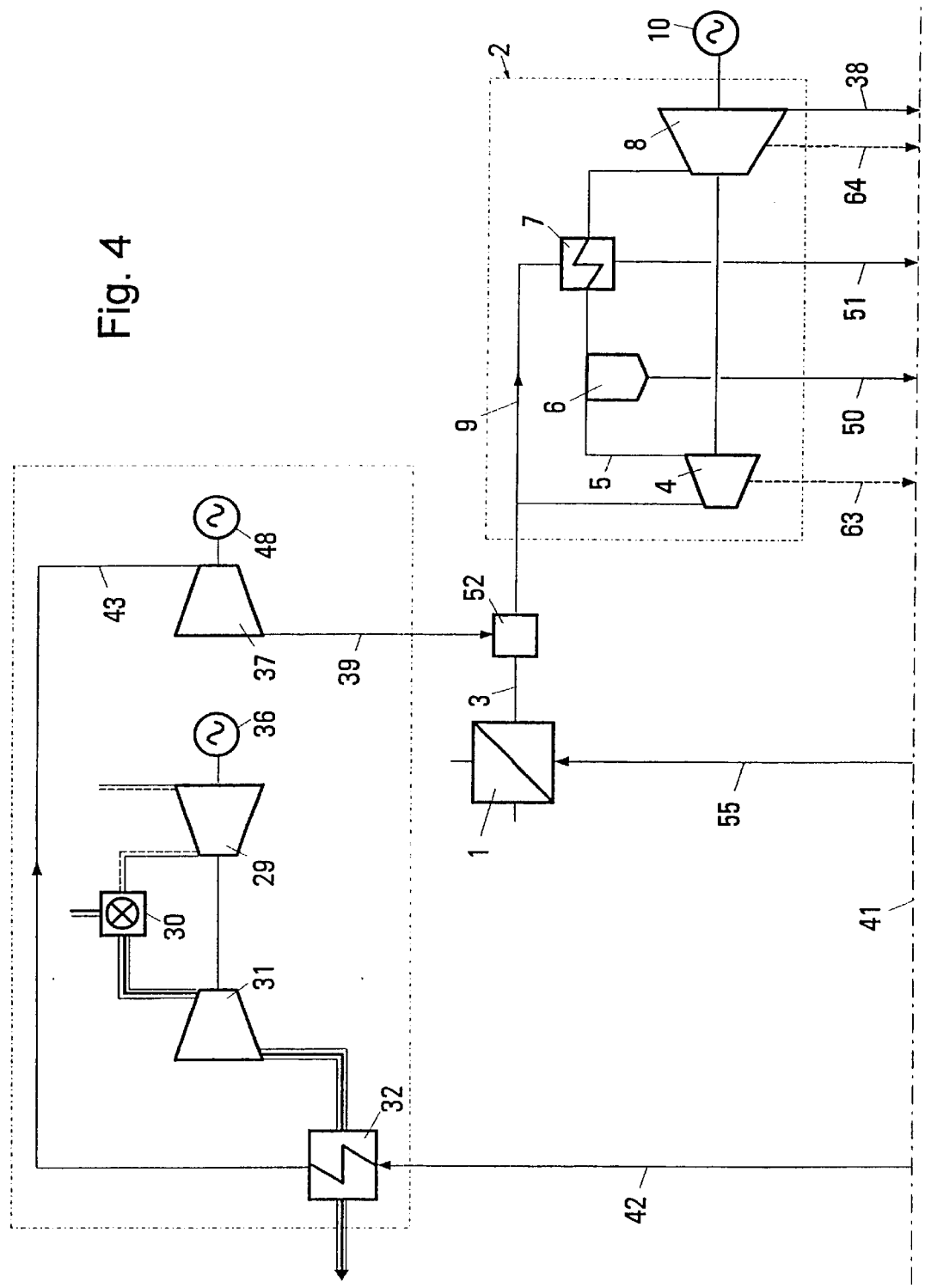

FIG. 1 diagrammatically depicts the water/steam cycle of a nuclear power plant,

FIG. 2 diagrammatically depicts a first variant of a supplemented nuclear power plant with a single shaft power train and an intermediate pressure steam mixing component, FIG. 3 diagrammatically depicts a first variant of a supplemented nuclear power plant with a single shaft power train and a low pressure steam mixing component, FIG. 4 diagrammatically depicts a first variant of a retrofitted nuclear power plant as shown in FIG. 2, with a multishaft power train.

Figure 5:
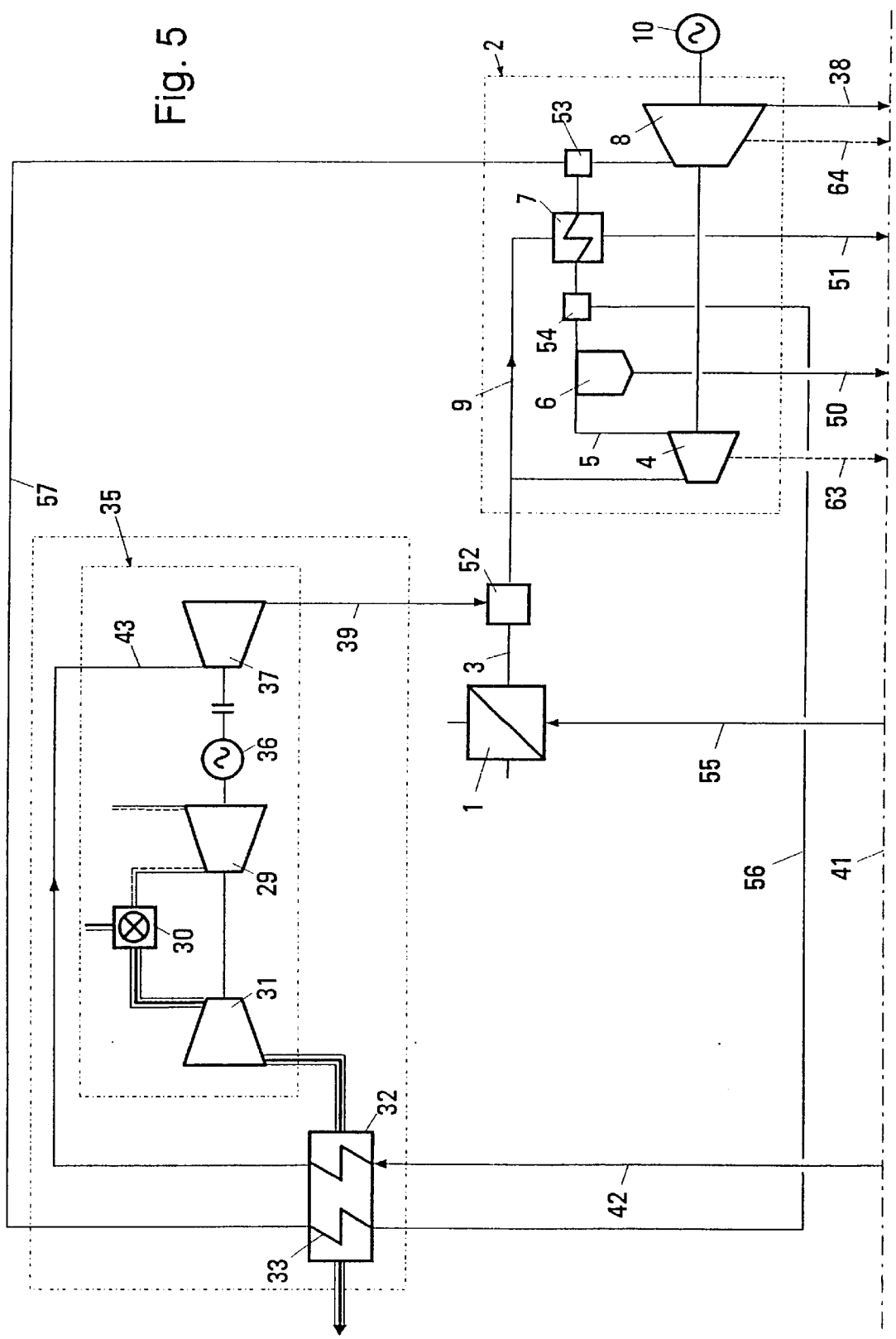
Figure 6:
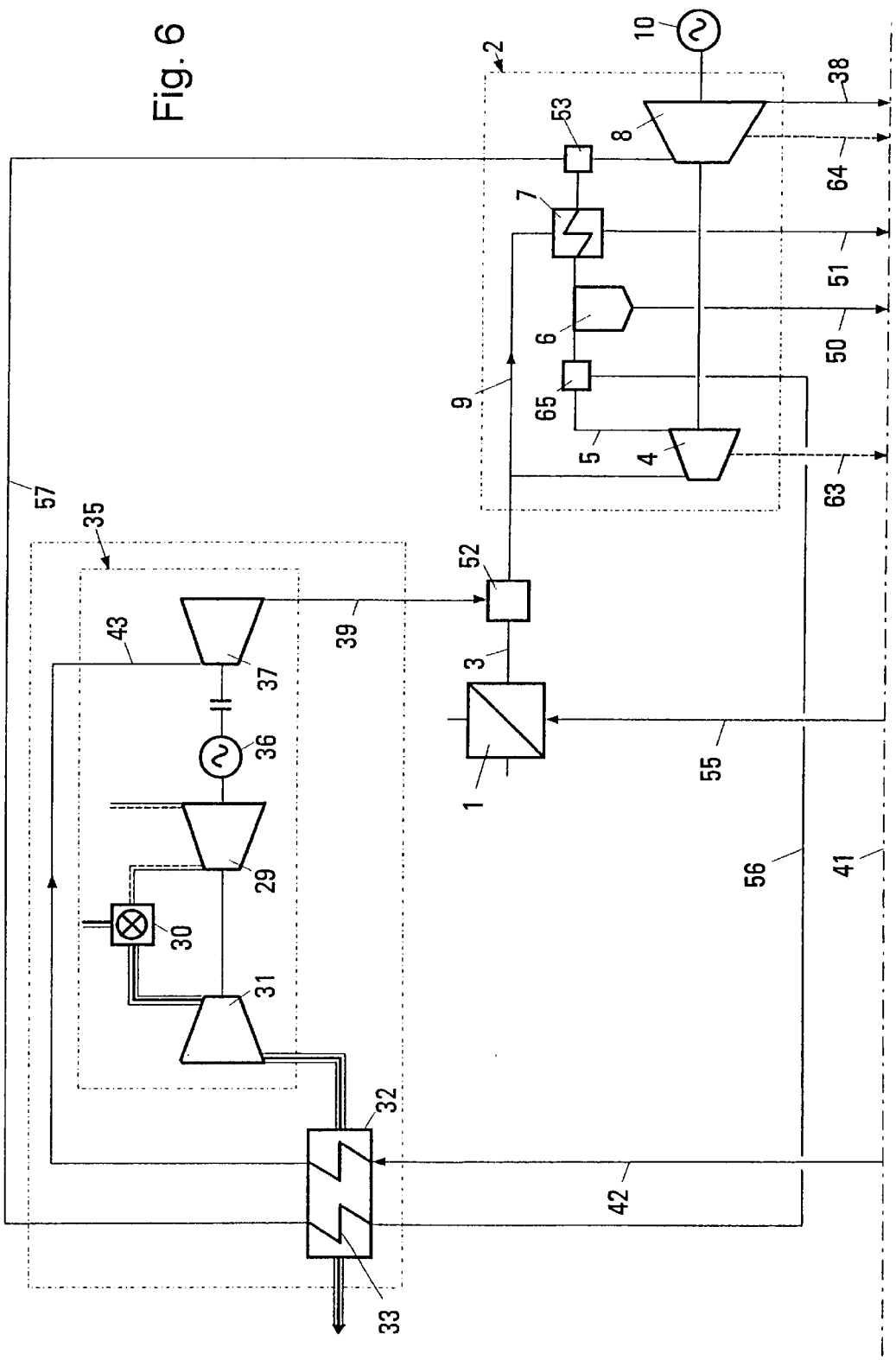
Figure 7:
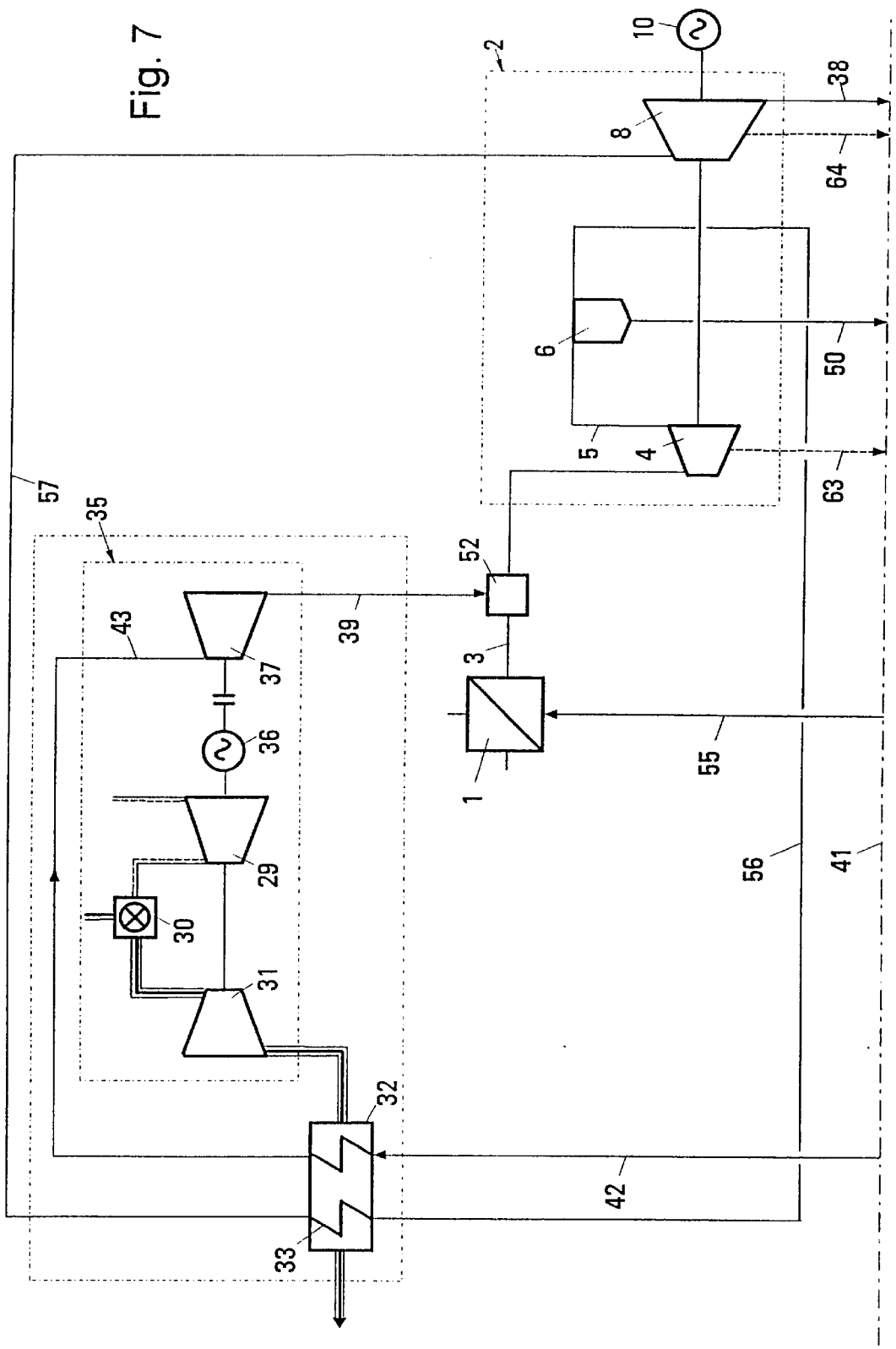
Figure 8:
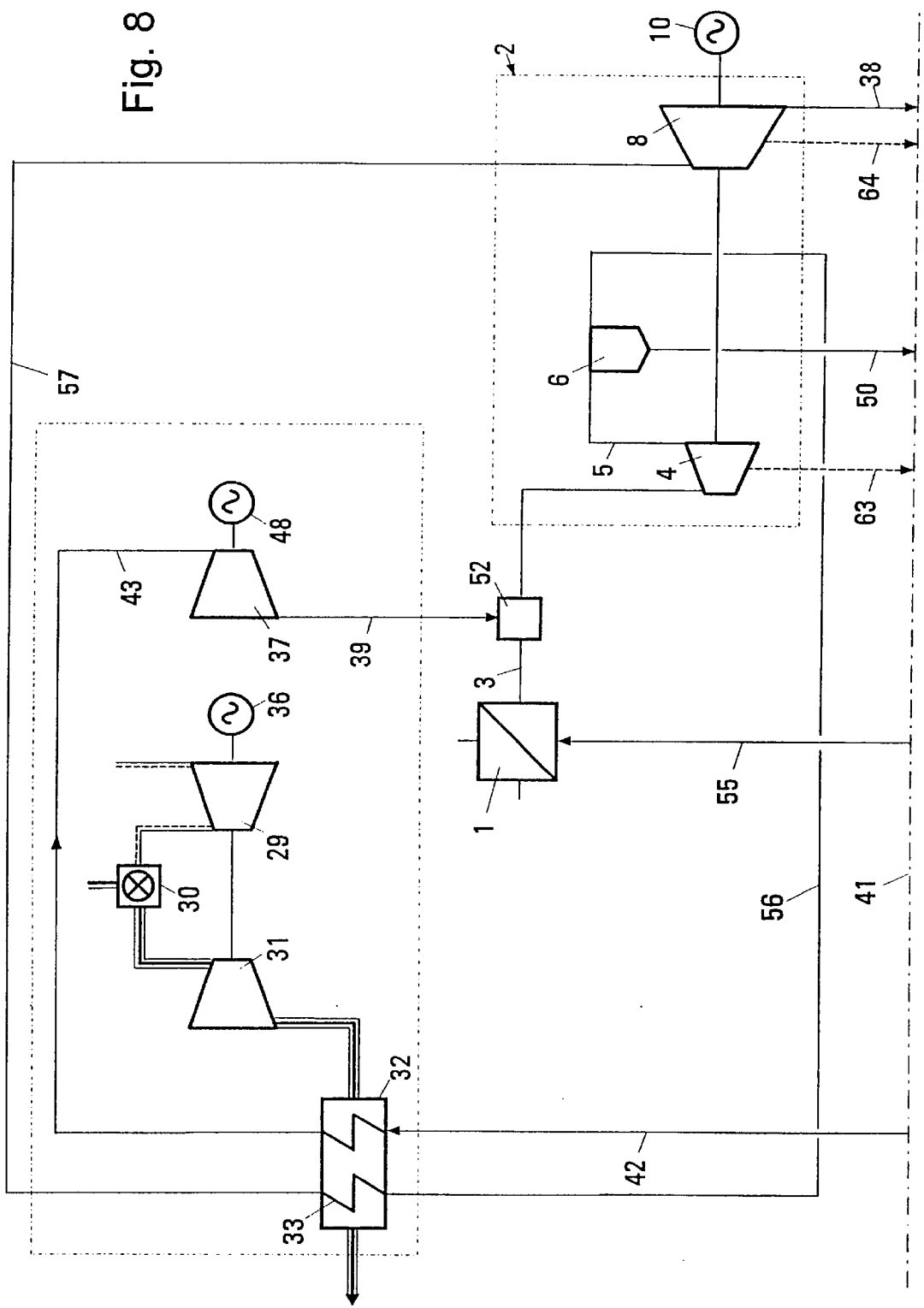
Figure 9:
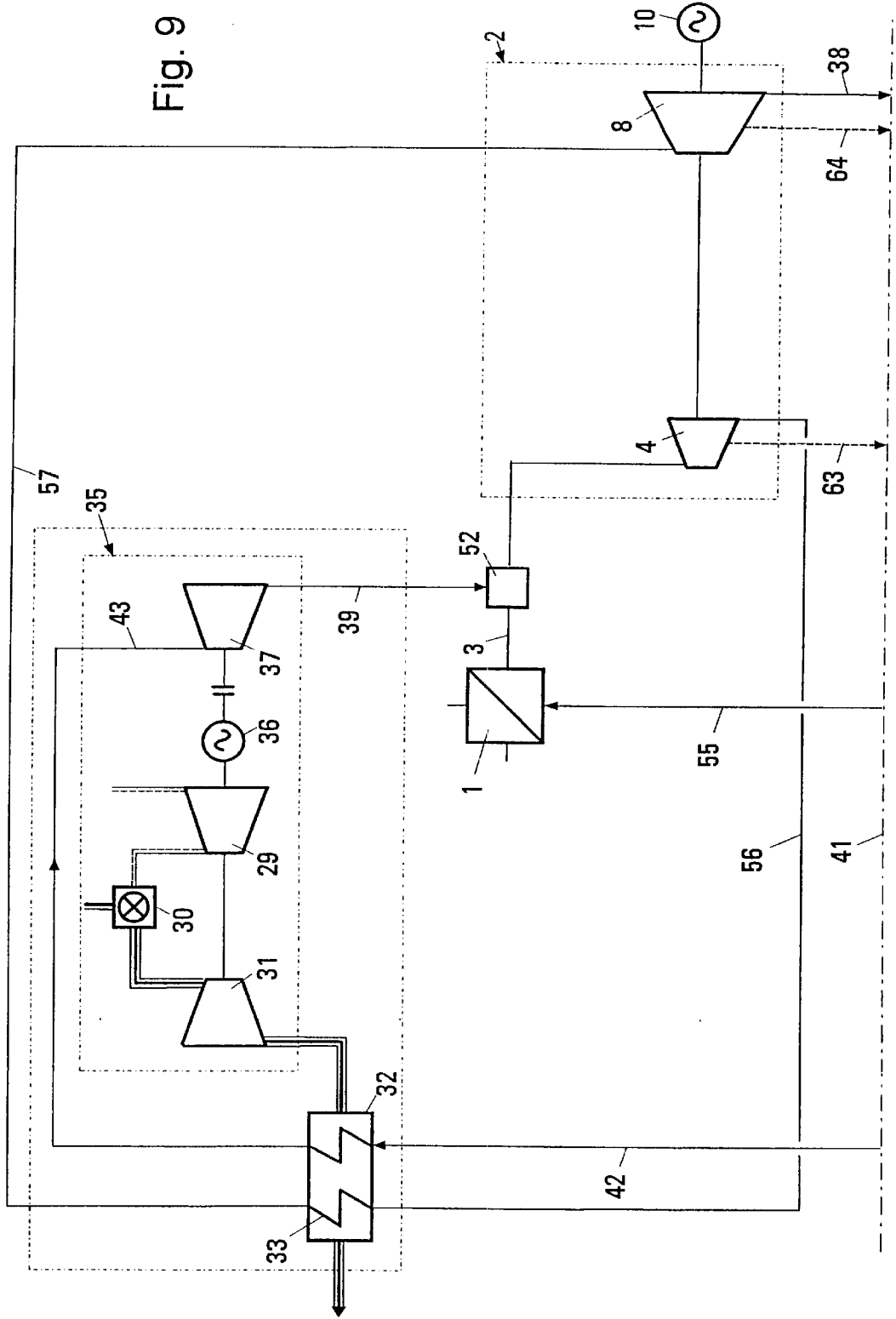
Figure 10:
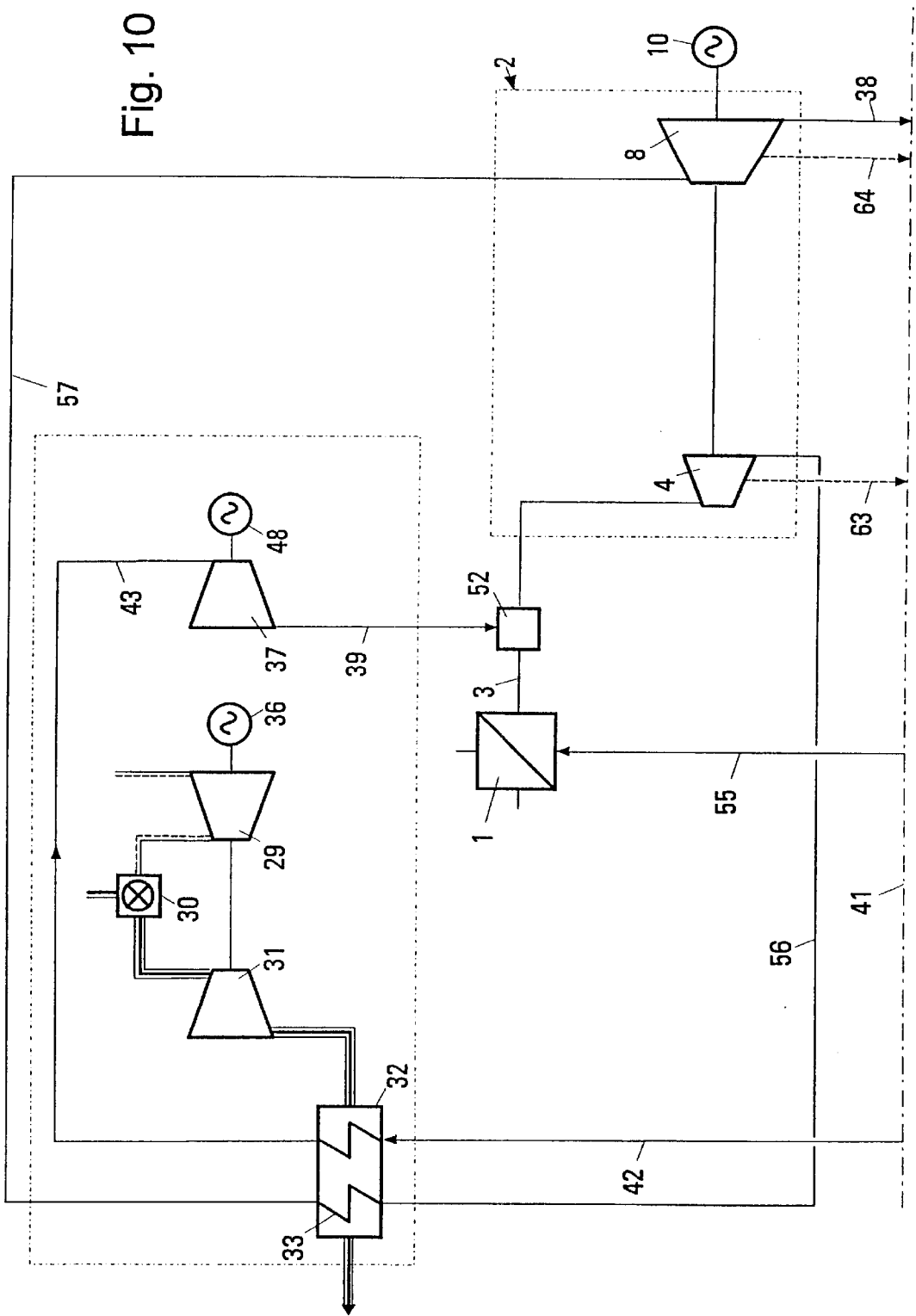
Figure 11:
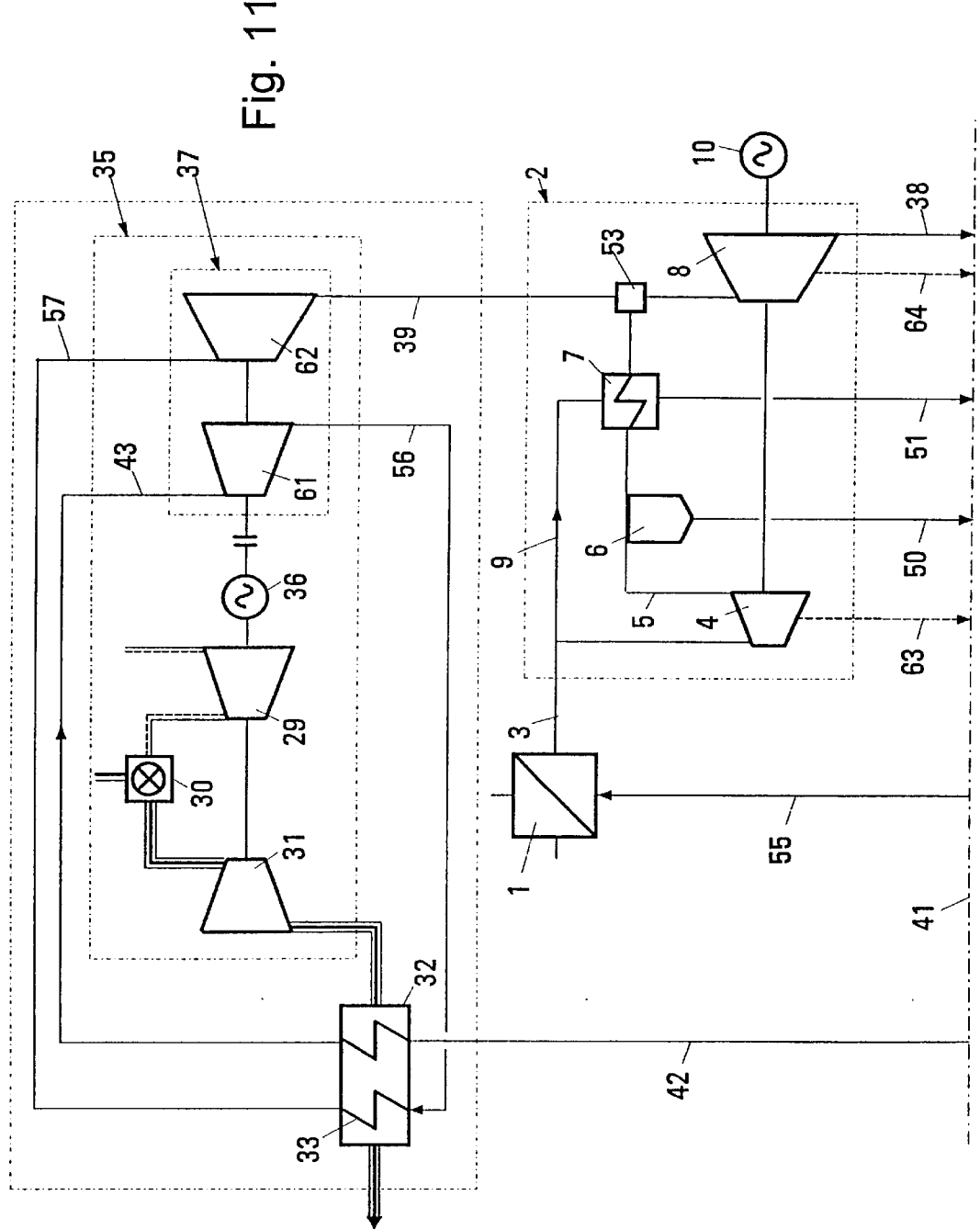
Figure 12:
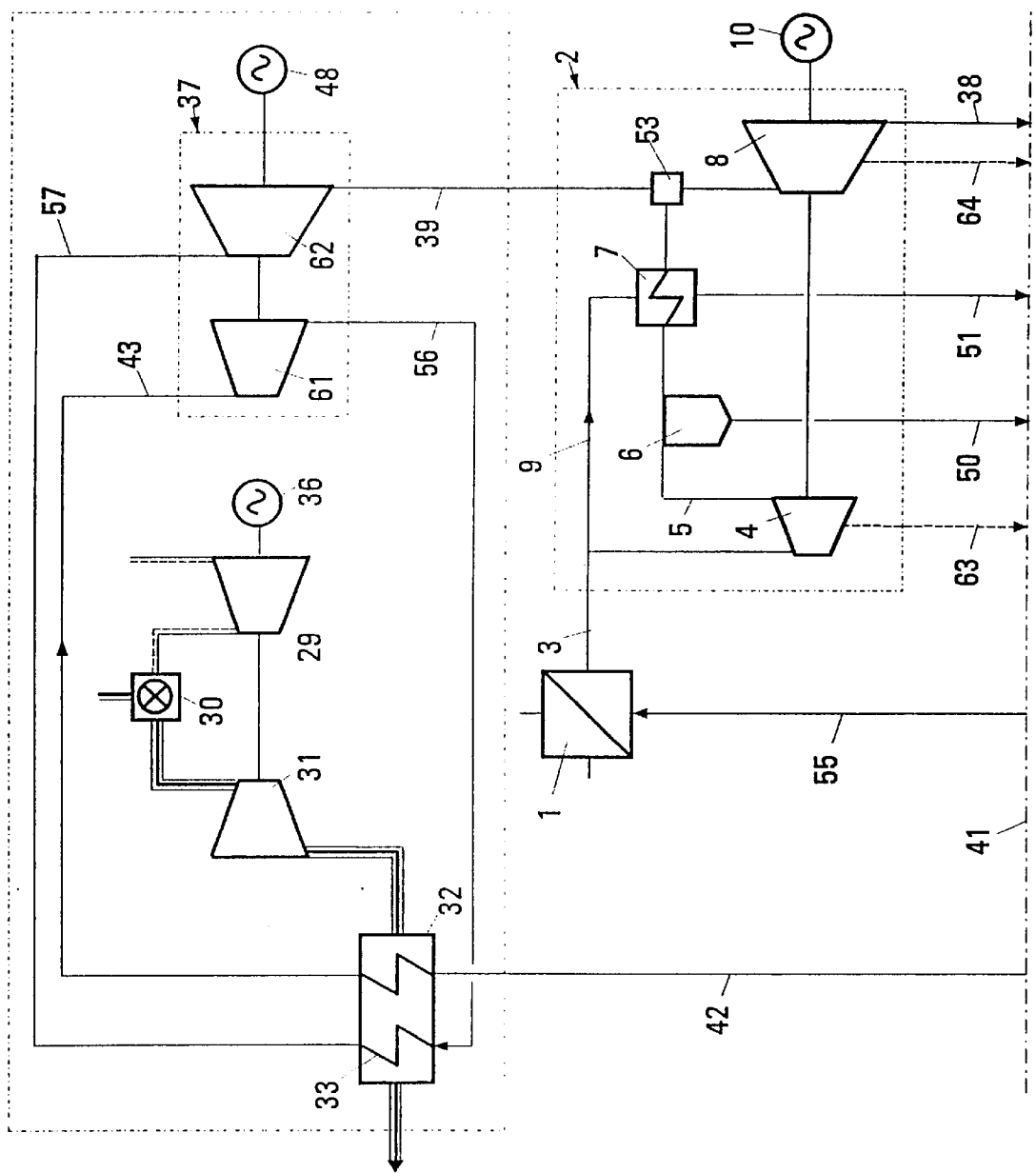
Figure 13:
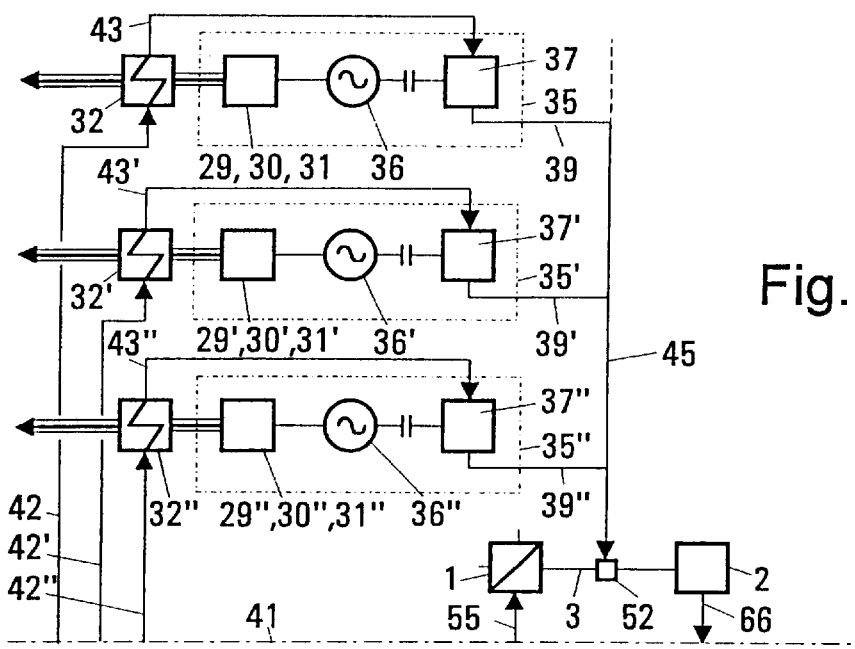
Figure 14:
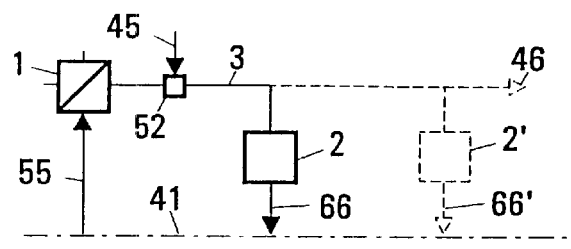
Figure 15:
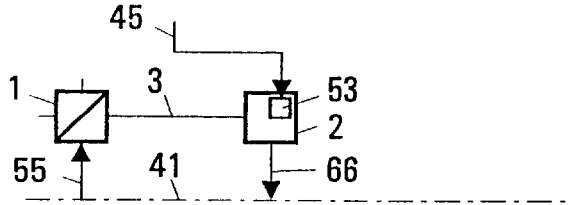
Figure 16:
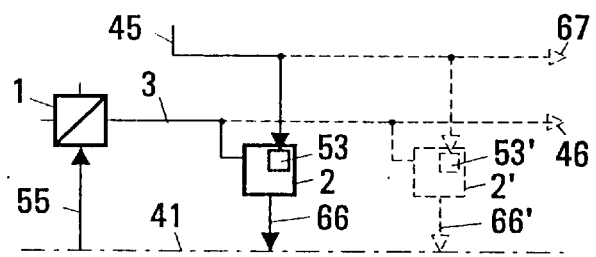
Figure 17:
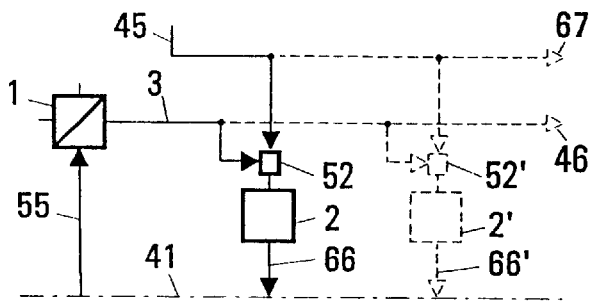
Figure 18:
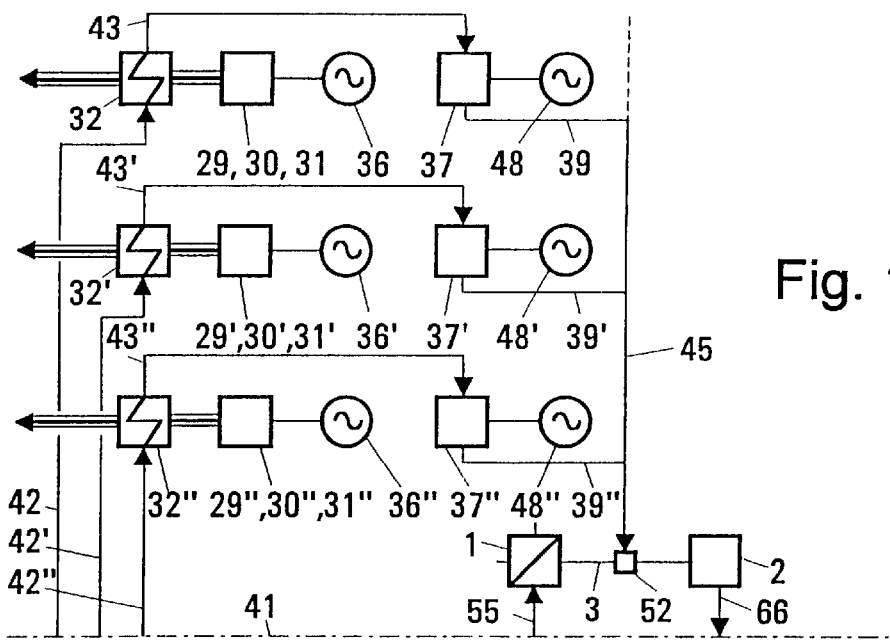
Figure 19:
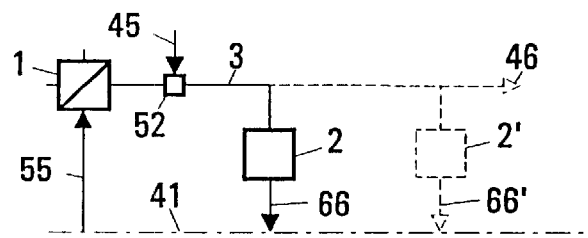
Figure 20:
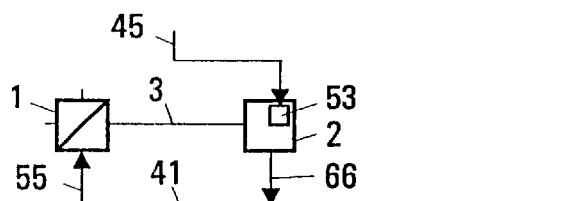
Figure 21:
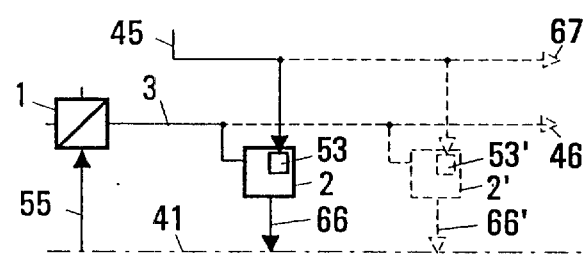
Figure 22:
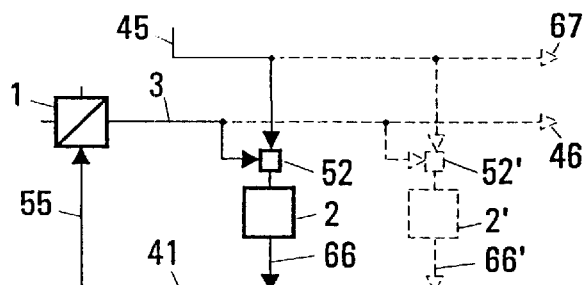
Figure 23:
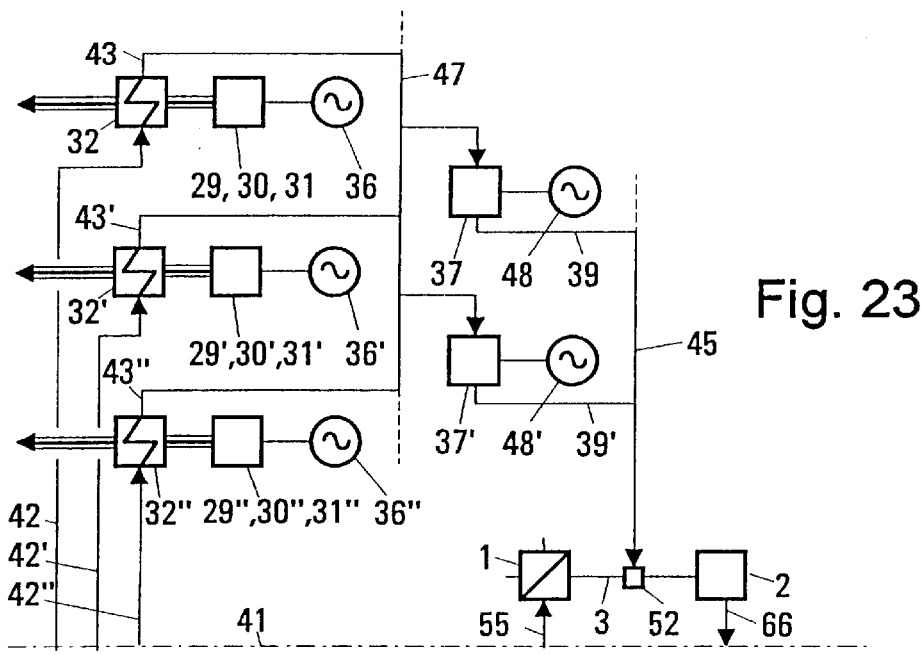
Figure 24:
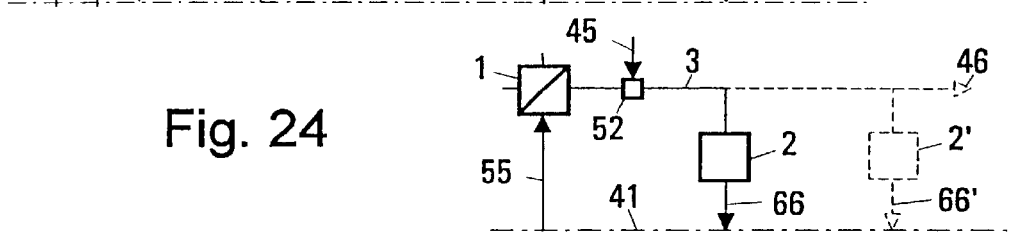
Figure 25:
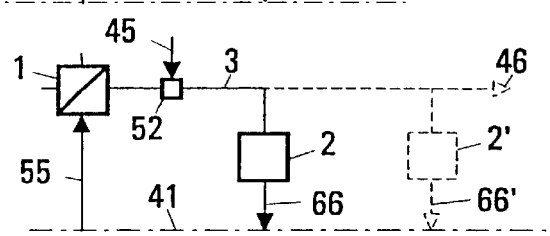
Figure 26:
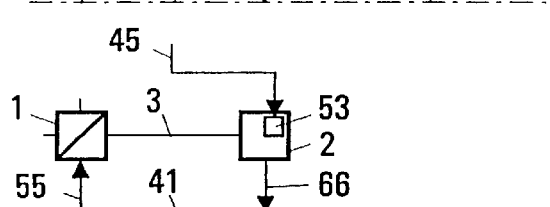
Figure 27:
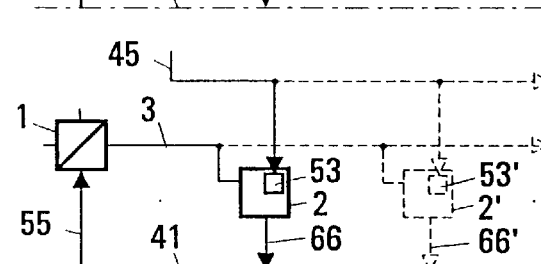
Figure 28:
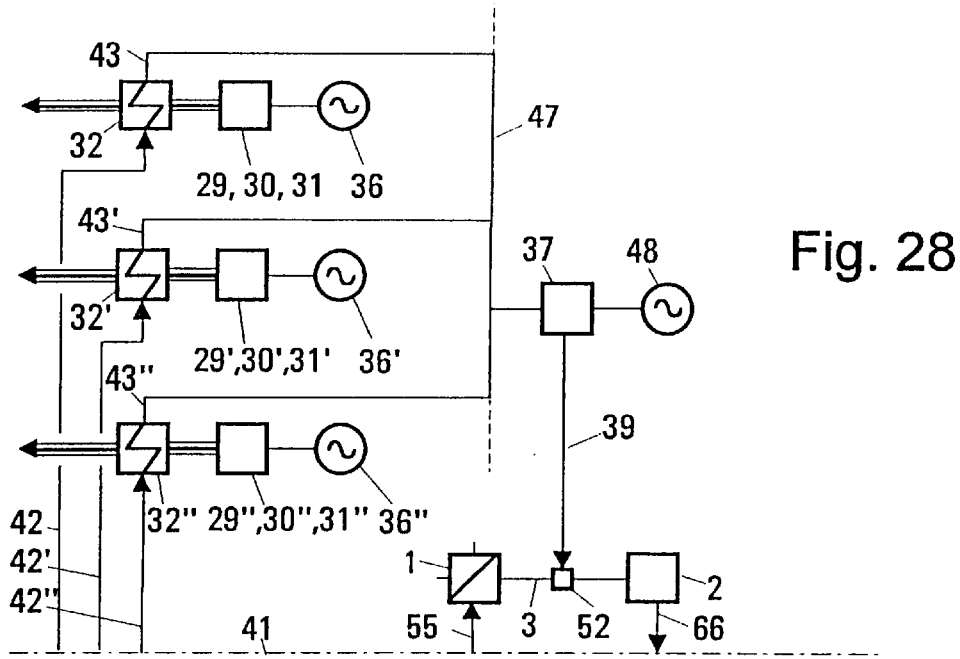
Figure 29:
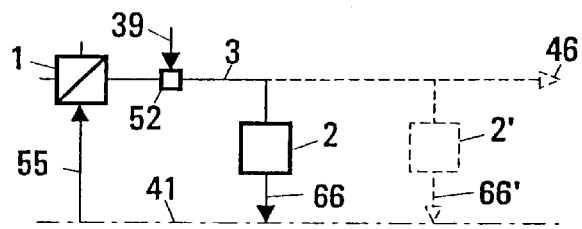
Figure 30:
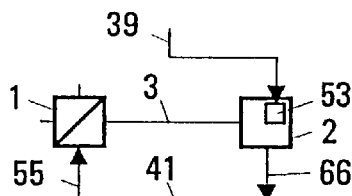
Figure 31:
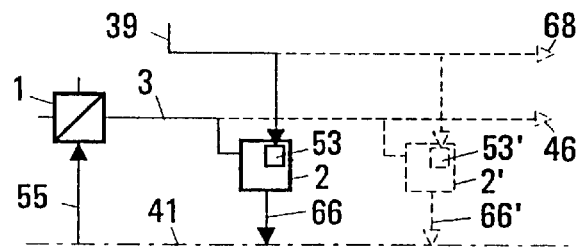
Figure 32:
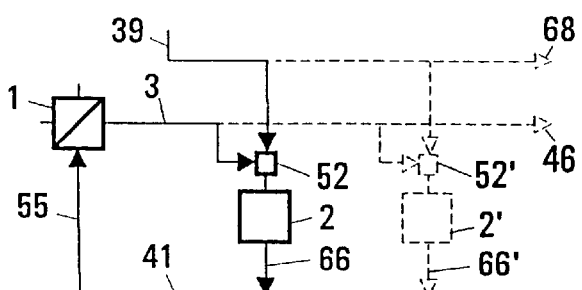
Figure 33:
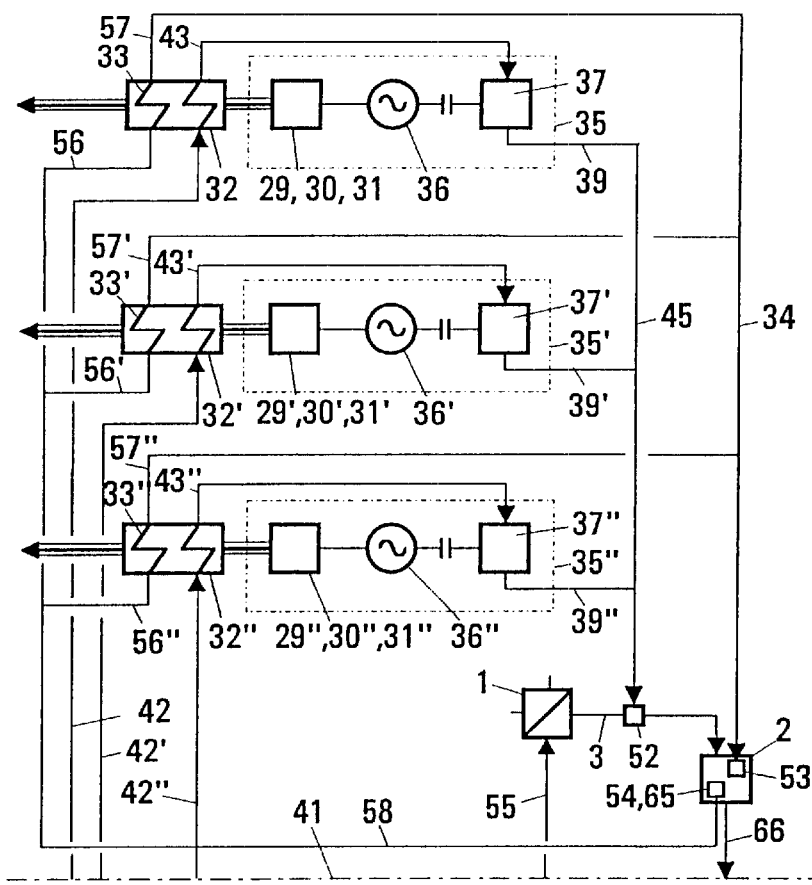
Figure 34:
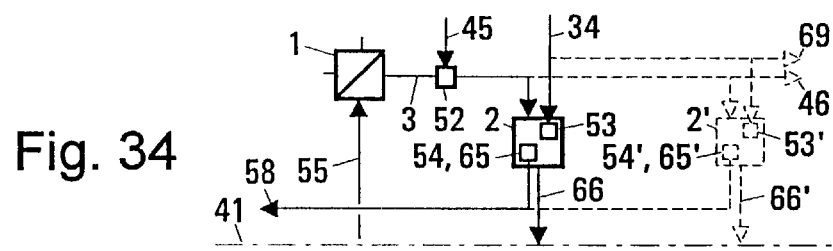
Figure 35:
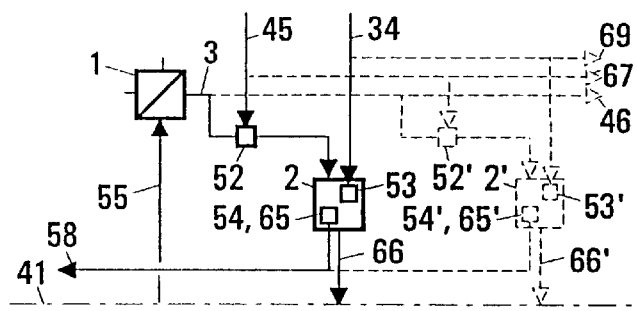
Figure 36:
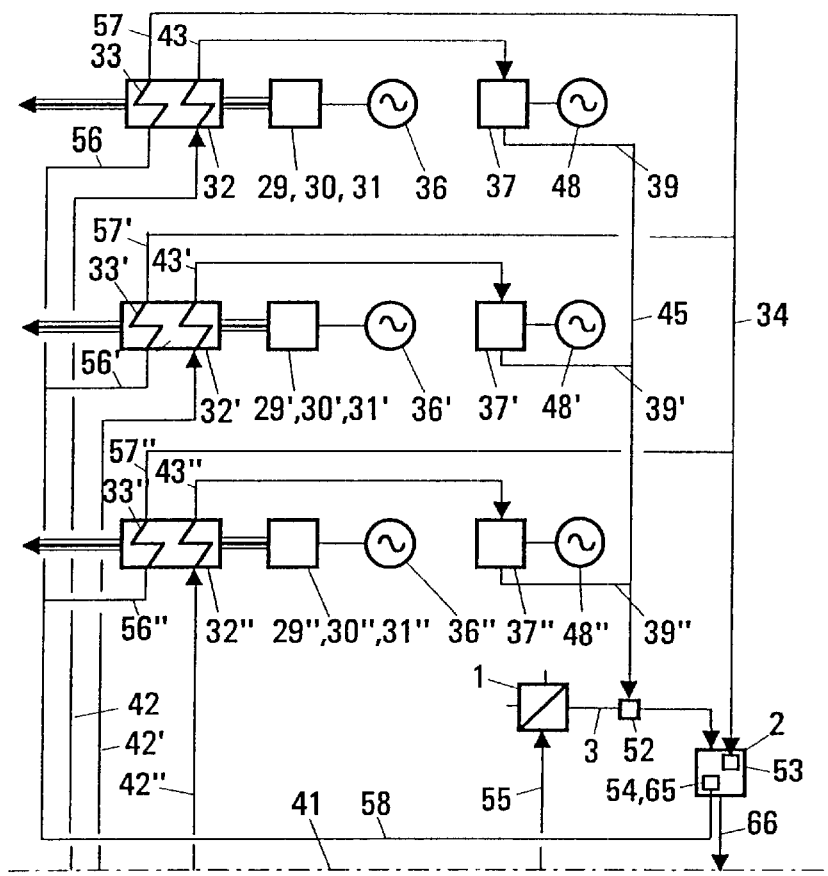
Figure 37:
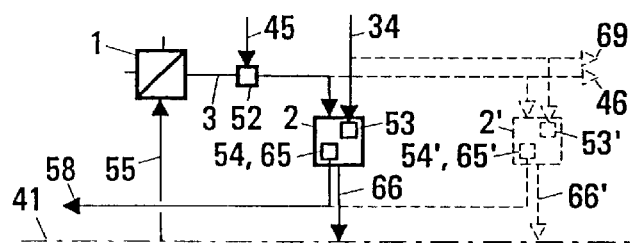
Figure 38:
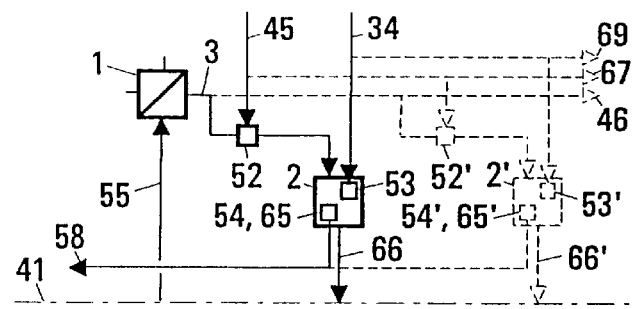
Figure 39:
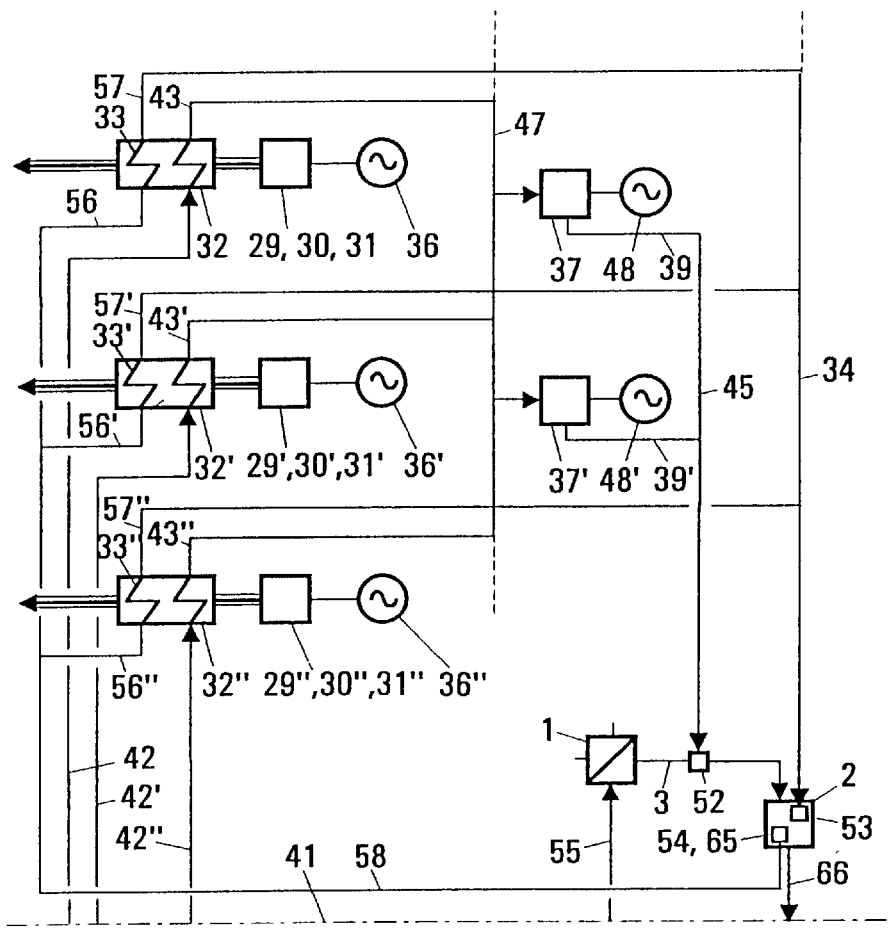
Figure 40:
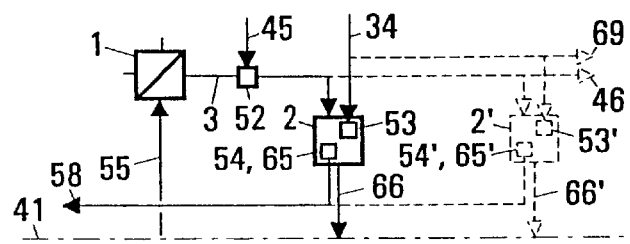
Figure 41:
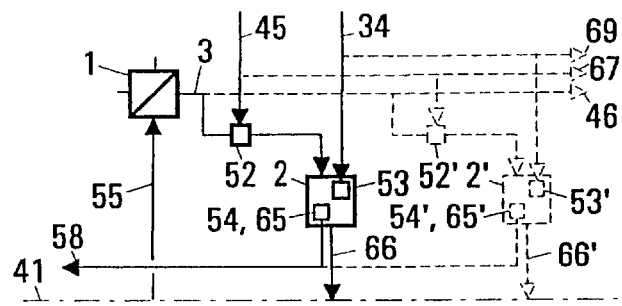
Figure 42:
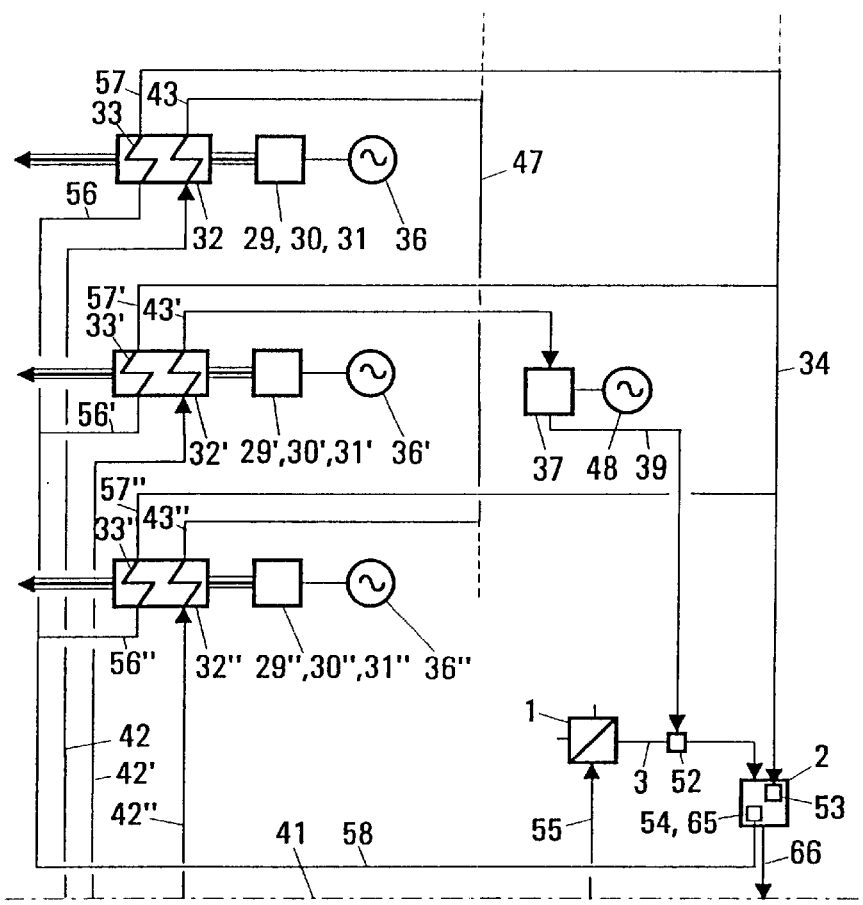
Figure 43:
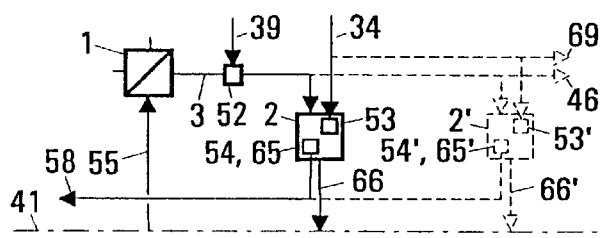
Figure 44:
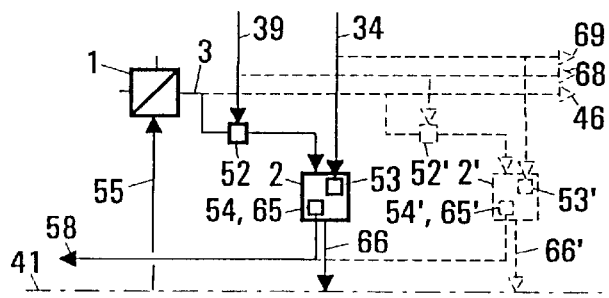
Figure 45:
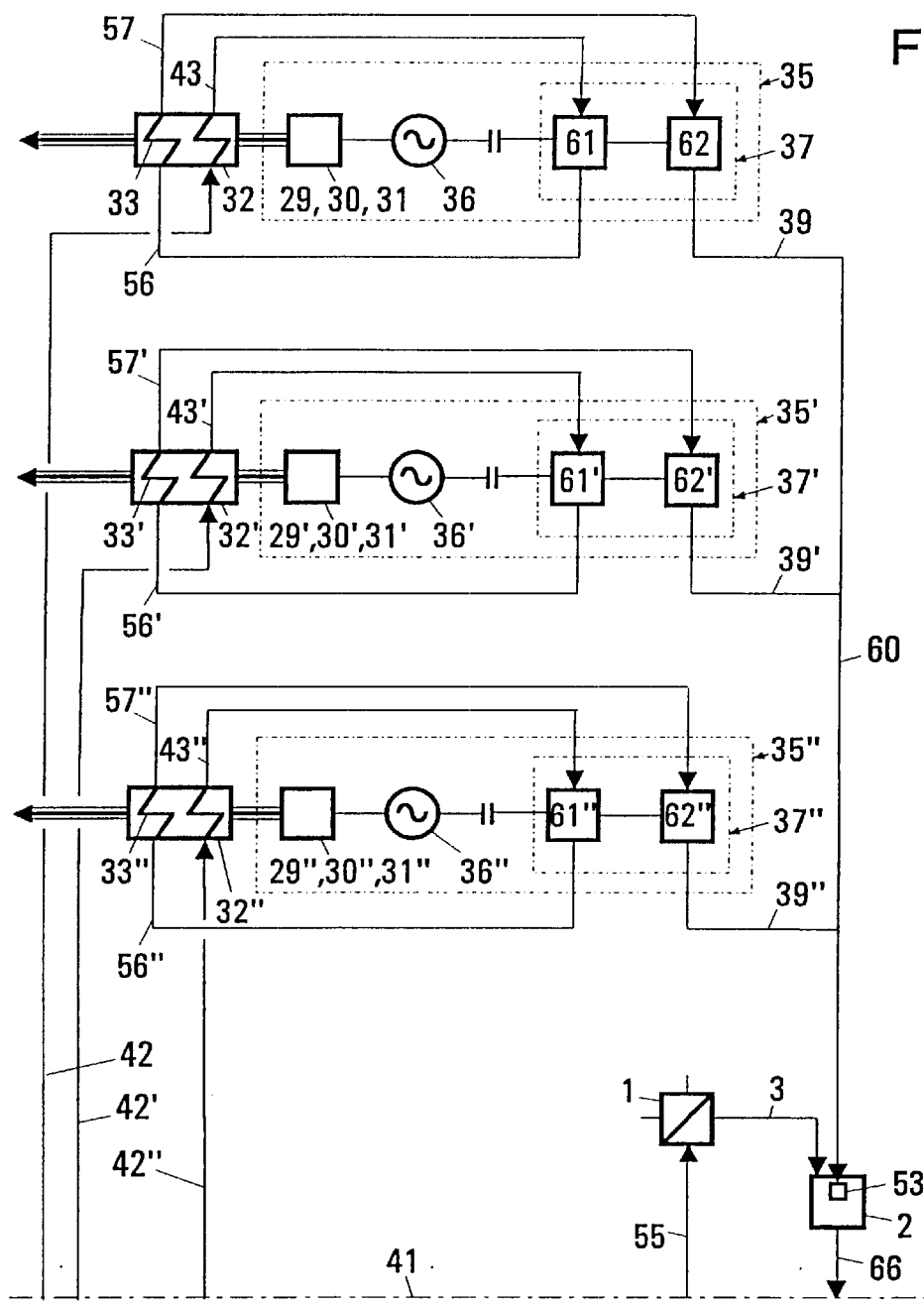
Figure 46:
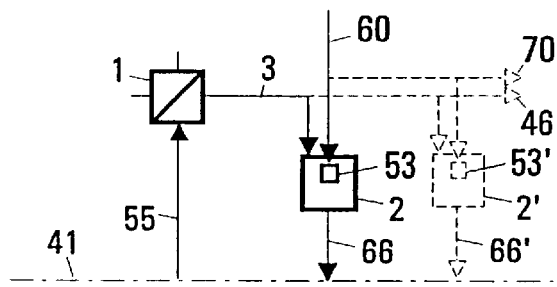
Figure 47:
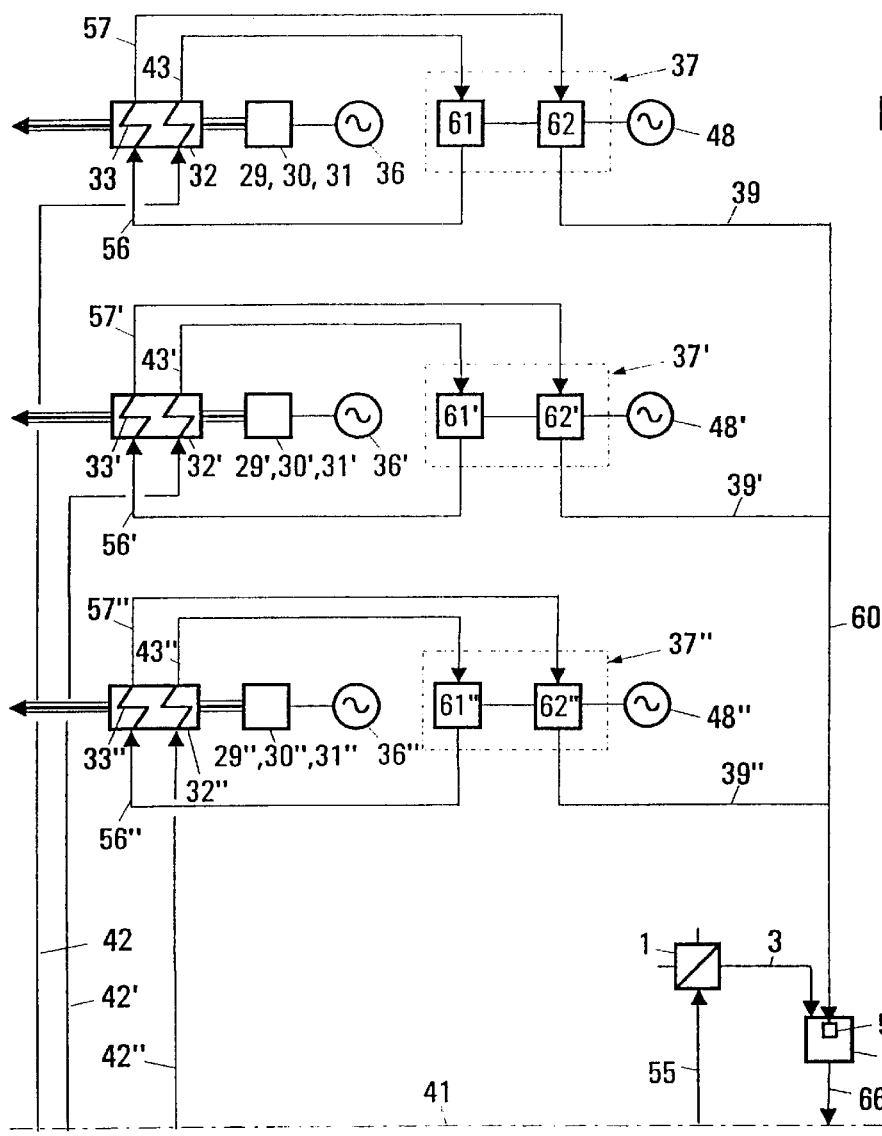
Figure 48:
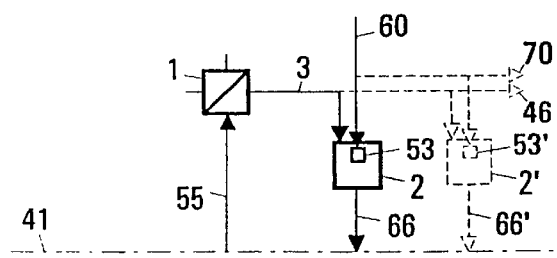
Figure 49:
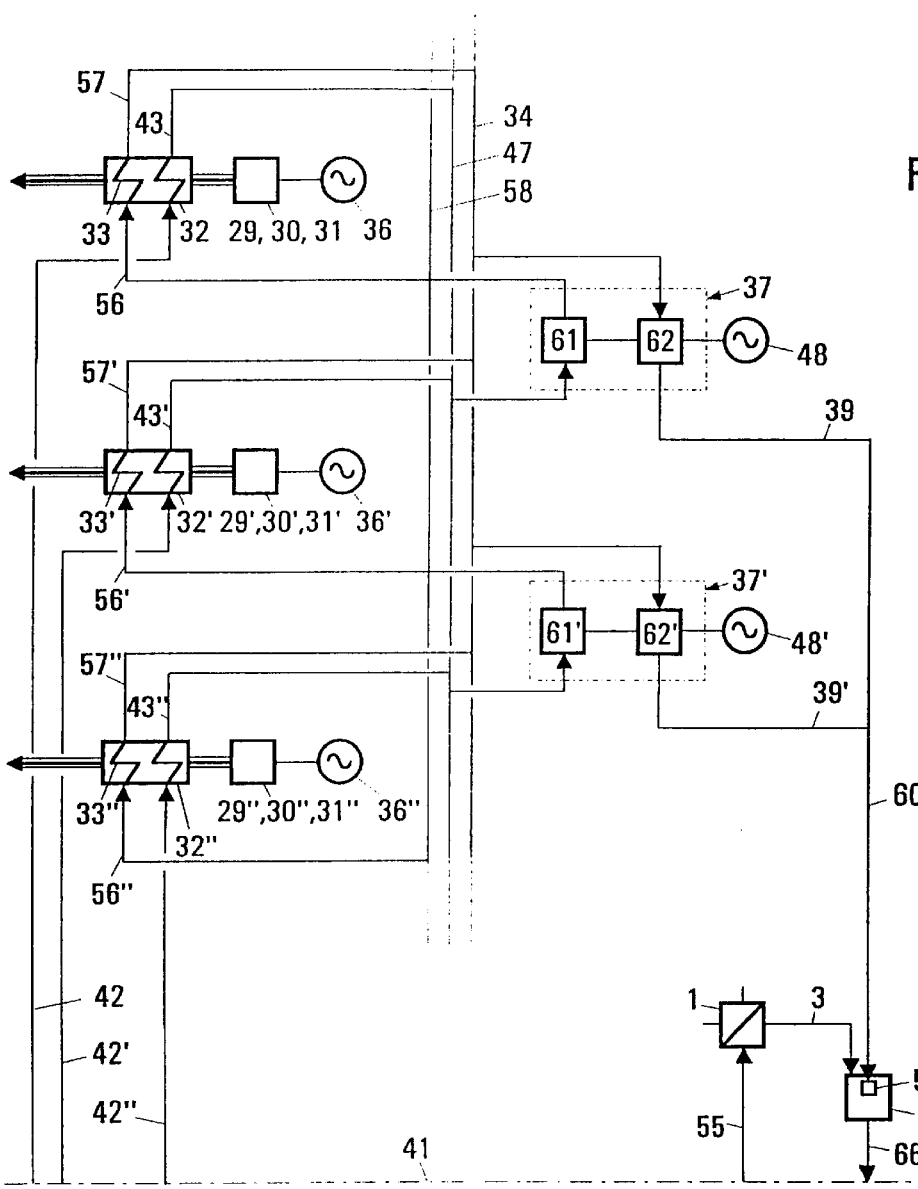
Figure 50:
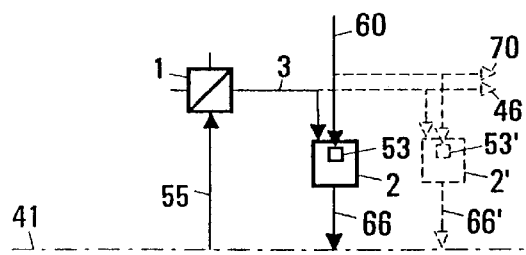
Figure 51:
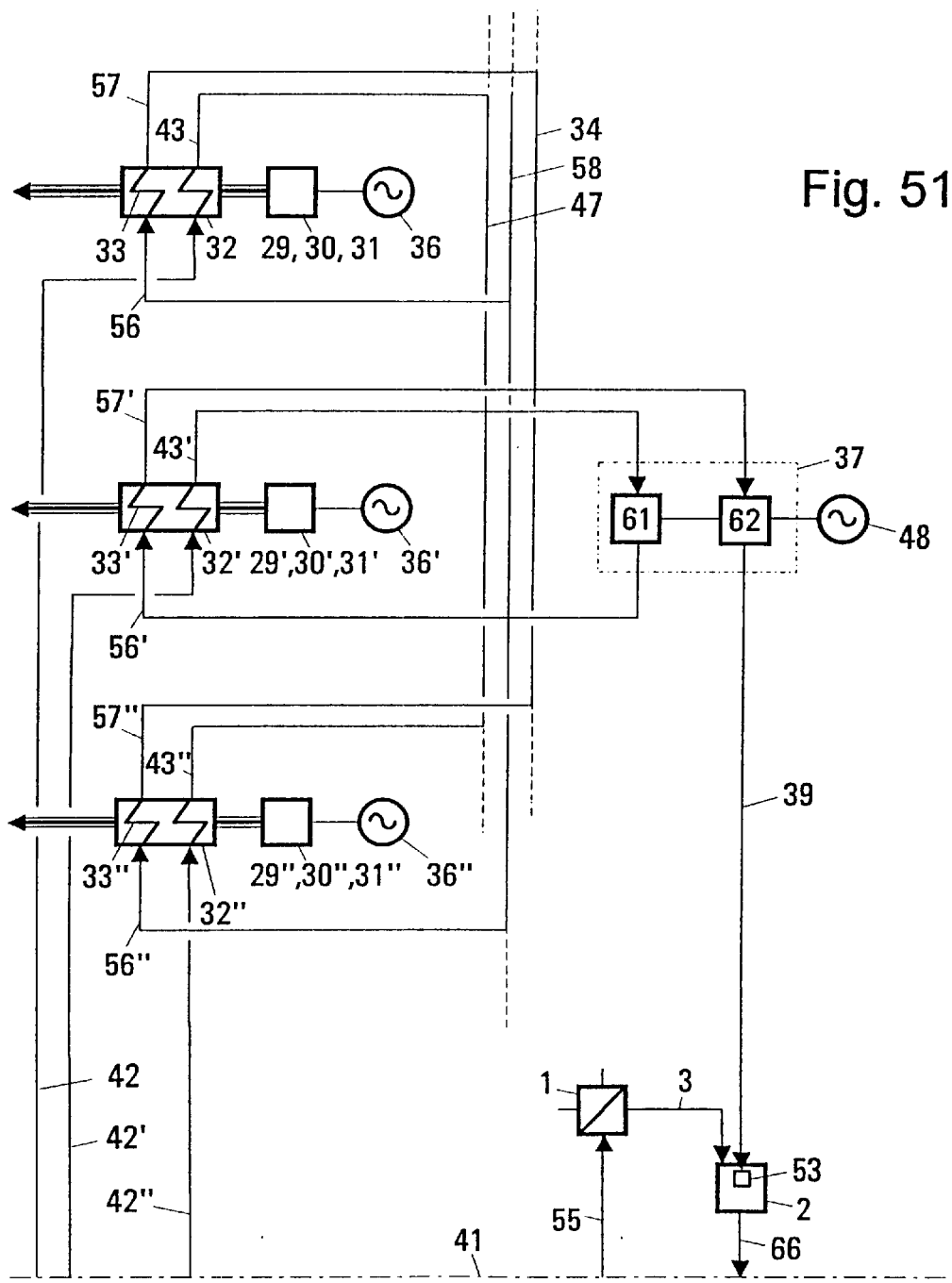
Figure 52:
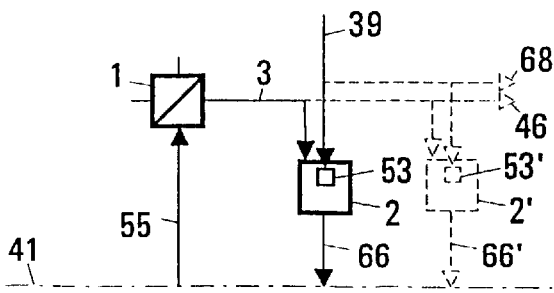

FIG. 5 diagrammatically depicts a second variant of a supplemented nuclear power plant with partial reheating in the heat recovery steam generator, with a steam branching component downstream of the separator of the steam turbine set, FIG. 6 diagrammatically depicts a second variant of a supplemented nuclear power plant with partial reheating in the heat recovery steam generator, having a steam branching component upstream of the separator of the steam turbine set, FIG. 7 diagrammatically depicts a second variant of a supplemented nuclear power plant with complete reheating in the heat recovery steam generator while maintaining the separation (single shaft power train), FIG. 8 diagrammatically depicts a second variant of a supplemented nuclear power plant with complete reheating in the heat recovery steam generator, while maintaining the separation (multishaft power train), FIG. 9 diagrammatically depicts a second variant of a supplemented nuclear power plant with complete reheating in the heat recovery steam generator, without the separation being maintained (single shaft power train), FIG. 10 diagrammatically depicts a second variant of a supplemented nuclear power plant with complete reheating in the heat recovery steam generator, without the separation being maintained (multishaft power train), FIG. 11 diagrammatically depicts a third variant of a supplemented nuclear power plant with reheating in the heat recovery steam generator and a topping steam turbine comprising a high pressure part and an intermediate pressure part (single shaft power train), FIG. 12 diagrammatically depicts a third variant of a supplemented nuclear power plant with reheating in the heat recovery steam generator and a topping steam turbine comprising a high pressure part and an intermediate pressure part (multishaft power train), FIG. 13 shows an embodiment with three gas turbine sets with the associated heat recovery steam generators, the corresponding topping steam turbines as a single shaft power train, the intermediate pressure common steam range and a steam turbine set (intermediate pressure steam mixing component), FIG. 14 shows an embodiment with three gas turbine sets with the associated heat recovery steam generators, the corresponding topping steam turbines as a single shaft power train, the intermediate pressure common steam range and a plurality of steam turbine sets (intermediate pressure steam mixing component), FIG. 15 shows an embodiment with three gas turbine sets with the associated heat recovery steam generators, the corresponding topping steam turbines as a single shaft power train, the intermediate pressure common steam range and one steam turbine set (lower pressure steam mixing component), FIG. 16 shows an embodiment with three gas turbine sets with the associated heat recovery steam generators, the corresponding topping steam turbines as a single shaft power train, the intermediate pressure common steam range and a plurality of steam turbine sets (a plurality of low pressure steam mixing components), FIG. 17 shows an embodiment with three gas turbine sets with the associated heat recovery steam generators, the corresponding topping steam turbines as a single shaft power train, the intermediate pressure common steam range and a plurality of steam turbine sets (a plurality of intermediate pressure steam mixing components), FIG. 18 shows an embodiment with three gas turbine sets with the associated heat recovery steam generators, the corresponding topping steam turbines as a multishaft power train, the intermediate pressure common steam range and one steam turbine set (intermediate pressure steam mixing component), FIG. 19 shows an embodiment with three gas turbine sets with the associated heat recovery steam generators, the corresponding topping steam turbines as a multishaft power train, the intermediate pressure common steam range and a plurality of steam turbine sets (intermediate pressure steam mixing component), FIG. 20 shows an embodiment with three gas turbine sets with the associated heat recovery steam generators, the corresponding topping steam turbines as a multishaft power train, the intermediate pressure common steam range and one steam turbine set (low-pressure steam mixing component), FIG. 21 shows an embodiment with three gas turbine sets with the associated heat recovery steam generators, the corresponding topping steam turbines as a multishaft power train, the intermediate pressure common steam range and a plurality of steam turbine sets (a plurality of low pressure steam mixing components), FIG. 22 shows an embodiment with three gas turbine sets with the associated heat recovery steam generators, the corresponding topping steam turbines as a multishaft power train, the intermediate pressure common steam range and a plurality of steam turbine sets (a plurality of intermediate pressure steam mixing components), FIG. 23 shows an embodiment with three gas turbine sets with the associated heat recovery steam generators, a high pressure common steam range, two topping steam turbines as a multishaft power train and one steam turbine set (intermediate pressure steam mixing component), FIG. 24 shows an embodiment with three gas turbine sets with the associated heat recovery steam generators, a high pressure common steam range, two topping steam turbines as a multishaft power train and a plurality of steam turbine sets (intermediate pressure steam mixing component), FIG. 25 shows an embodiment with three gas turbine sets with the associated heat recovery steam generators, a high pressure common steam range, two topping steam turbines as a multishaft power train and one steam turbine set (low pressure steam mixing component), FIG. 26 shows an embodiment with three gas turbine sets with the associated heat recovery steam generators, a high pressure common steam range, two topping steam turbines as a multishaft power train and a plurality of steam turbine sets (a plurality of low pressure steam mixing components), FIG. 27 shows an embodiment with three gas turbine sets with the associated heat recovery steam generators, a high pressure common steam range, two topping steam turbines as a multishaft power train and a plurality of steam turbine sets (a plurality of intermediate pressure steam mixing components), FIG. 28 shows an embodiment with three gas turbine sets with the associated heat recovery steam generators, a high pressure common steam range, a single topping steam turbine as a multishaft power train and one steam turbine set (intermediate pressure steam mixing component), FIG. 29 shows an embodiment with three gas turbine sets with the associated heat recovery steam generators, a high pressure common steam range, a single topping steam turbine as a multishaft power train and a plurality of steam turbine sets (intermediate pressure steam mixing component), FIG. 30 shows an embodiment with three gas turbine sets with the associated heat recovery steam generators, a high pressure common steam range, a single topping steam turbine as a multishaft power train and one steam turbine set (low pressure steam mixing component), FIG. 31 shows an embodiment with three gas turbine sets with the associated heat recovery steam generators, a high pressure common steam range, a single topping steam turbine as a multishaft power train and a plurality of steam turbine sets (a plurality of low pressure steam mixing components), FIG. 32 shows an embodiment with three gas turbine sets with the associated heat recovery steam generators, a high pressure common steam range, a single topping steam turbine as a multishaft power train and a plurality of steam turbine sets (a plurality of intermediate pressure steam mixing components), FIG. 33 shows an embodiment with three gas turbine sets with the associated heat recovery steam generators, with reheating, the corresponding topping steam turbines as a single shaft power train, cold and hot reheat common steam range and one steam turbine set (intermediate pressure steam mixing component), FIG. 34 shows an embodiment with three gas turbine sets with the associated heat recovery steam generators, with reheating, the corresponding topping steam turbines as a single shaft power train, cold and hot reheat common steam range and a plurality of steam turbine sets (intermediate pressure steam mixing component), FIG. 35 shows an embodiment with three gas turbine sets with the associated heat recovery steam generators, with reheating, the corresponding topping steam turbines as a single shaft power train, cold and hot reheat common steam range and a plurality of steam turbine sets (a plurality of intermediate pressure steam mixing components), FIG. 36 shows an embodiment with three gas turbine sets with the associated heat recovery steam generators, with reheating, the corresponding topping steam turbines as a multishaft power train, cold and hot reheat common steam range and one steam turbine set (intermediate pressure steam mixing component), FIG. 37 shows an embodiment with three gas turbine sets with the associated heat recovery steam generators, with reheating, the corresponding topping steam turbines as a multishaft power train, cold and hot reheat common steam range and a plurality of steam turbine sets (intermediate pressure steam mixing component), FIG. 38 shows an embodiment with three gas turbine sets with the associated heat recovery steam generators, with reheating, the corresponding topping steam turbines as a multishaft power train, cold and hot reheat common steam range and a plurality of steam turbine sets (a plurality of intermediate pressure steam mixing component), FIG. 39 shows an embodiment with three gas turbine sets with the associated heat recovery steam generators, with reheating, a high pressure common steam range, two topping steam turbines as a multishaft power train, cold and hot reheat common steam range and one steam turbine set (intermediate pressure steam mixing component), FIG. 40 shows an embodiment with three gas turbine sets with the associated heat recovery steam generators, with reheating, a high pressure common steam range, two topping steam turbines as a multishaft power train, cold and hot reheat common steam range and a plurality of steam turbine sets (intermediate pressure steam mixing component), FIG. 41 shows an embodiment with three gas turbine sets with the associated heat recovery steam generators, with reheating, a high pressure common steam range, two topping steam turbines as a multishaft power train, cold and hot reheat common steam range and a plurality of steam turbine sets (a plurality of intermediate pressure steam mixing components), FIG. 42 shows an embodiment with three gas turbine sets with the associated heat recovery steam generators, with reheating, a high pressure common steam range, a single topping steam turbine as a multishaft power train, cold and hot reheat common steam range and one steam turbine unit (intermediate pressure steam mixing component), FIG. 43 shows an embodiment with three gas turbine sets with the associated heat recovery steam generators, with reheating, a high pressure common steam range, a single topping steam turbine as a multishaft power train, cold and hot reheat common steam range and a plurality of steam turbine sets (intermediate pressure steam mixing component), FIG. 44 shows an embodiment with three gas turbine sets with the associated heat recovery steam generators, with reheating, a high pressure common steam range, a single topping steam turbine as a multishaft power train, cold and hot. reheat common steam range and a plurality of steam turbine sets (a plurality of intermediate pressure steam mixing components), FIG. 45 shows an embodiment with three gas turbine sets with the associated heat recovery steam generators, with reheating, the corresponding topping steam turbines comprising high pressure part and intermediate pressure part as a single shaft power train, low pressure common steam range and one steam turbine set, FIG. 46 shows an embodiment with three gas turbine sets with the associated heat recovery steam generators, with reheating, the corresponding topping steam turbines comprising high pressure part and intermediate pressure part as a single shaft power train, low pressure common steam range and a plurality of steam turbine sets, FIG. 47 shows an embodiment with three gas turbine sets with the associated heat recovery steam generators, with reheating, the corresponding topping steam turbines comprising high pressure part and intermediate pressure part as a multishaft power train, low pressure common steam range and one steam turbine set, FIG. 48 shows an embodiment with three gas turbine sets with the associated heat recovery steam generators, with reheating, the corresponding topping steam turbines comprising high pressure part and intermediate pressure part as a multishaft power train, low pressure common steam range and a plurality of steam turbine sets, FIG. 49 shows an embodiment with three gas turbine sets with the associated heat recovery steam generators, with reheating, two topping steam turbines comprising high pressure part and intermediate pressure part as a multishaft power train, low pressure common steam range and one steam turbine set, FIG. 50 shows an embodiment with three gas turbine sets with the associated heat recovery steam generators, with reheating, two topping steam turbines comprising high pressure part and intermediate pressure part as a multishaft power train, low pressure common steam range and a plurality of steam turbine sets, FIG. 51 shows an embodiment with three gas turbine sets with the associated heat recovery steam generators, with reheating, a single topping steam turbine comprising high pressure part and intermediate pressure part as a multishaft power train, exhaust steam line and one steam turbine set, and FIG. 52 shows an embodiment with three gas turbine sets with the associated heat recovery steam generators, with reheating, a single topping steam turbine comprising high pressure part and intermediate pressure part as a multishaft power train, exhaust steam line and a plurality of steam turbine sets.

DETAILED DESCRIPTION OF THE INVENTION

FIG. 1 diagrammatically depicts the water/steam cycle of a nuclear power plant by way of example for a saturated steam generation system having at least one steam turbine set.

Saturated steam is generated in a nuclear steam generation system 1, and a substantial part of this saturated steam is fed through the steam line 3 of the saturated steam intermediate pressure steam turbine 4 to the steam turbine set 2. The remaining part of the saturated steam which is generated is fed to the reheater 7. In the embodiment shown, the steam turbine set 2 has a saturated steam intermediate pressure steam turbine 4. The exhaust steam from this saturated steam intermediate pressure steam turbine 4 flows via a cross-over line 5, a (moisture) separator 6 and a reheater 7 to the low pressure steam turbine 8. The reheater 7 is fed with steam from the nuclear steam generation system 1 via the branch steam line 9. By contrast to reheating in a boiler, the reheating in this case uses flowing steam. The saturated steam intermediate pressure steam turbine 4 and the low pressure steam turbine 8 drive the generator 10 via a shaft.

For energy reasons, the condensate from the separator 6 and the reheater 7 is passed to the preheater associated with the corresponding steam pressure or to the next lower pressure stage. This means that in the present case the steam condensate produced in the reheater 7 is fed, via the condensate line 51, to the final high pressure feed water heater 25 (HP feedwater heater) before the nuclear steam generation system 1, and the condensate from the separator 6 is fed, via the condensate line 50, to the low pressure feedwater heater 17 (LP feedwater heater) upstream of the feedwater tank/deaerator 21.

The exhaust steam from the low pressure steam turbine 8 flows via the exhaust steam line 38 to the condenser 11 with the hotwell 12.

From the hotwell 12, the condensate is conveyed through the condensate line 14, by means of the condensate pump 13, to the LP feedwater heaters 15, 16, 17. The LP feedwater heaters 15, 16, 17 are supplied with steam from the low pressure steam turbine 8 by means of the bleed steam lines 18, 19, 20.

The number and arrangement of LP feedwater heaters are to be regarded as examples aimed at explaining the design of the plant. As is known, in a steam power plant the feedwater heating may be carried out in numerous different ways.

In the direction of the feedwater, the LP feedwater heater 17 is followed by the feedwater tank/deaerator 21. From the latter, the feedwater is conveyed to the HP feedwater heaters 23, 24, 25 by the high pressure feedwater pump 22. The corresponding bleed steam lines running from the saturated steam intermediate pressure steam turbine to the feedwater tank/deaerator 21 and to the HP feedwater heaters 23, 24, 25 are denoted by the reference numerals 26, 27, 28, 44.

The number and arrangement of HP feedwater heaters may also be designed in a very wide range of variants.

From the final HP feedwater heater 25, the feedwater ultimately flows via the feedwater line 55 to the nuclear steam generation system 1.

In FIG. 1, the bleed steam condensate from the feedwater heaters is discharged in cascade form into the feedwater tank/deaerator 21 or the hotwell 12. Naturally, a very wide range of circuit variants are possible in this region.

While the condensate from HP feedwater heaters is being discharged, as shown, generally in cascade form into the feedwater tank/deaerator 21, numerous combinations of cascade and feed pump circuits are possible within low pressure feedwater heater columns.

The design of the feedwater heater column, i.e. the way in which the condensate is discharged and the presence of deheaters and aftercoolers, is not relevant with regard to the present invention.

Especially in the case of the steam temperatures in the range from 260 to 315° C. which can be realized with light water reactors, the optimum steam power process requires saturated steam conditions or only slight steam superheating of up to at most 30 K at the steam turbine inlet. Consequently, the pressures at the steam turbine inlet are in the range from 45 to 70 bar. For reasons of technical feasibility, but also for economic reasons, in most industrial light water reactors reheating by the nuclear system is ruled out. Therefore, to process the steam in a low pressure part, only steam drying in a separator 6 followed by reheating 7 using flowing steam can be recommended.

With respect to parameters at the steam turbine inlet or with respect to the designation of a steam turbine, the concept of saturated steam used below is understood to mean steam conditions at the steam turbine inlet in the range of low wetness of approximately 5 to 8% up to superheating of at most 30 K.

A saturated steam generation system 1 is understood to mean
- a saturated steam boiler or
- a nuclear steam generation system. The functional principle, the structure, the parameters and the like are of no importance. A nuclear steam generation system may involve a boiling water reactor or even a pressurized water reactor with the plurality of primary circuits.

The name steam turbine set 2 employed below also includes, in addition to the saturated steam intermediate pressure steam turbine 4, the low pressure steam turbine 8 and the separator 6, the reheater 7 and the connecting lines 3, 5, 9.

If the nuclear steam generation system 1 of the power plant now has to be operated at reduced power for one of the reasons mentioned in the introduction, in a first variant the power plant is supplemented with at least one gas turbine set 29, 30, 31, 36, at least one heat recovery steam generator 32, at least one topping steam turbine 37 and at least one intermediate pressure steam mixing component 52, which is situated in the steam line 3 between the nuclear steam generation system 1 and the steam turbine set 2, as illustrated in simplified form in FIG. 2.

The gas turbine set 29, 30, 31, 36 includes a compressor 29, a combustion chamber 30, a gas turbine 31 and a generator 36. The exhaust gas from the gas turbine 31 is used in the heat recovery steam generator 32 for the purpose of steam generation. The steam coming from the heat recovery steam generator 32 is fed to the topping steam turbine 37 via the live steam line 43. The exhaust steam from the topping steam turbine 37 is fed to the intermediate pressure steam mixing component 52 via the exhaust steam line 39, and this mixing component is also fed with the steam from the nuclear steam generation system 1. The steam flows from the intermediate pressure steam mixing component 52 to the existing steam turbine set 2.

The generator 36 of the gas turbine set 29, 30, 31, 36 is connected via a coupling to the topping steam turbine 37, so that a single shaft power train 35 is formed.

The steam parameters of the heat recovery steam generator 32 and the design of the topping steam turbine 37 are now selected in such a way that the exhaust steam parameters of the topping steam turbine 37 correspond to the conditions of the existing saturated steam intermediate pressure steam turbine 4 and of the reheater 7.

In this first variant, therefore, the nuclear steam generation system 1 is supplemented by at least one gas turbine set, comprising compressor 29, combustion chamber 30, gas turbine 31 and generator 36, at least one heat recovery steam generator 32, at least one topping steam turbine 37 and at least one intermediate pressure steam mixing component 52.

The line 41 denotes the interface to the water/steam cycle, to which the various condensate lines and steam lines lead and from which the feedwater line 42 returns to the heat recovery steam generator 32 or the feedwater line 55 returns to the nuclear steam generation system 1.

In the case of a steam power plant, the possibility exists of increasing the efficiency of the steam process by raising the feedwater temperature by regenerative feedwater heating. For this reason, nuclear power plants, such as that shown in FIG. 1, have multistage regenerative feedwater preheating systems.

In a combined-cycle power plant, i.e. when utilizing the waste heat of a gas turbine for steam generation in a heat recovery steam generator, the efficiency of the overall process is at its maximum when the power of the steam turbine is at its maximum. This implies the greatest possible cooling of the exhaust gas in the heat recovery steam generator, which in turn prevents regenerative feedwater heating. The preheating of the feedwater/condensate should advantageously take place in the heat recovery steam generator.

For reasons associated with avoiding dew point corrosion at the cold end of the heat recovery steam generator, the feedwater temperature should not fall below a minimum as a function, for example, of the sulfur content of the gas turbine fuel. In addition, it may be necessary to degas the feedwater pumped to the heat recovery steam generators. Both may involve limited preheating of the feedwater in the lower temperature range. In the specific case, use will initially be made of the condensate from the separator 6 and the reheater 7, and only in a later stage will bleed be realized in the lower pressure range.

In all variants for supplementing the nuclear power plant, the live steam parameters are raised due to the upstream connection of a topping steam turbine. In consequence, the high pressure feedwater heaters, at least, and possibly also the high pressure feedwater pump cannot be employed in their present arrangement in the supplemented system. By contrast, the condensate pump 13, the low pressure feedwater heaters 15–17 and the feedwater tank/deaerator 21 may possibly be retained in the supplemented system.

The water/steam cycle described with reference to FIG. 1, with condenser and hotwell, the condensate pump and the regenerative feedwater heater column, comprising the LP feedwater heaters, the feedwater tank/deaerator, the high pressure feedwater pump and the HP feedwater heaters, the bleed steam lines, the condensate outlets and the like, is retained for the nuclear steam generation system 1.

Depending on the steam parameters to be achieved, the at least one supplemented heat recovery steam generator 32 could be supplied with feedwater by, for example, the existing high pressure feedwater pump 22 from the feedwater tank/deaerator 21 or by a separate feedwater pump from the hotwell 12 of the condenser 11 or from the feedwater tank/deaerator 21.

The extent to which the realization of the preheating of the feedwater of the heat recovery steam generator in the lower temperature range takes place in the heat recovery steam generator or by feedwater heaters heated by bleed steam depends on the specific installations used, the condensate temperature, the gas turbine fuel, the overall thermodynamic concept, the chemical process and the like.

The adaptations in this region of the water/steam cycle necessary due to the conversion of a saturated steam generation system having a steam turbine set are, however, without significance for the invention and will not therefore be considered in the rest of the description.

In FIG. 2 and all the subsequent figures, the feedwater lines 42 running from the water/steam cycle to the heat recovery steam generators 32 and the feedwater line 55 running to the nuclear steam generation system 1 are presented first. In addition, the condensate lines 50, 51 and steam lines 38, 18, 19, 20, 26, 27, 28, 44 running from the steam turbine set 2, possibly to the water/steam cycle, are represented individually but also in combination. As has already been explained, that part of the water/steam cycle which is not represented is without significance for the invention.

In this first variant, the supplemented topping steam turbine 37 together with the gas turbine installation 29, 30, 31 and the generator 36 is arranged on one shaft. This concept is therefore referred to as a single shaft power train 35. The advantage of this single shaft power train 35 consists firstly in the fact that there is no need for a separate generator for the topping steam turbine 36 and also in the operational advantages of a clear association between gas turbine set 29, 30, 31, 36, heat recovery steam generator 32 and topping steam turbine 37.

In addition to the possibility described of realizing a single shaft power train 35, the at least one topping steam turbine may, of course, also be embodied as a separate steam turbine set with its own generator. This concept is referred to as a multishaft power train.

This may be advantageous in particular if a large number of gas turbine installations are required for supplementing the nuclear power plant. It is then possible for the individual topping steam turbine sets to be combined to form one topping steam turbine set.

While a gas turbine installation is understood to mean an installation comprising compressor, combustion chamber and gas turbine, the term gas turbine set additionally includes the generator. The same definition applies to the steam turbine set, which comprises the possible plurality of steam turbine components and the associated generator.

In FIG. 3, the nuclear steam generation system 1 is supplemented in accordance with the first variant shown in FIG. 2. The difference from the embodiment shown in FIG. 2 is the arrangement of a low pressure steam mixing component 53 in the cross-over line 5 immediately upstream of the low pressure steam turbine 8. In this case, the exhaust steam from the topping steam turbine 37 is fed, together with the steam coming from the reheater 7, to the low pressure steam turbine 8 via the low pressure steam mixing component 53.

This embodiment also applies to the variants given below.

In a manner analogous to FIG. 2, the interface to the water/steam cycle is indicated by the line 41.

In FIG. 4, the nuclear steam generation system 1, as in the first variant shown in FIG. 2, is once again supplemented with at least one gas turbine set 29, 30, 31, 36, comprising compressor 29, combustion chamber 30, gas turbine 31 and generator 36, at least one heat recovery steam generator 32, at least one topping steam turbine 37 and at least one intermediate pressure steam mixing component 52. Unlike in FIG. 2, the topping steam turbine 37 has its own generator 48. Therefore, in this embodiment the gas turbine set 29, 30, 31, 36 and the topping steam turbine set 37, 48 form a multishaft power train.

This multishaft power train embodiment also applies to the following variants. In this case the number of gas turbine sets present is independent of the number of topping steam turbine sets present.

In a similar manner to FIG. 2, the interface to the water/steam cycle is indicated by the line 41.

Of course, as shown in FIG. 3 the exhaust steam from the topping steam turbine 37 could in this design of the multishaft power train too be fed to a low pressure steam mixing component 53 in the cross-over line 5 directly upstream of the low pressure steam turbine 8.

FIG. 5 shows a further second variant, based on the first variant, for supplementing a nuclear power plant. In this second variant, the exhaust steam from the saturated steam intermediate pressure steam turbine 4 is reheated at least in part on the mass flow side in the heat recovery steam generator 32. Unlike in FIG. 2, in the embodiment shown in FIG. 5 a heat recovery steam generator 32 with reheater 33 and, in addition, a steam branching component 54 and a low pressure steam mixing component 53 are supplemented.

Downstream of the separator 6, by means of the steam branching component 54 part of the steam is guided via the cold reheat line 56 to the reheater 33 of the heat recovery steam generator 32, where it is reheated, is returned via the hot reheat line 57 to the steam turbine set 2 and is reintroduced upstream of the low pressure steam turbine 8 by means of the low pressure steam mixing component 53, so that the load on the reheater 7 (by flowing steam) is relieved.

Those parts of the installation which correspond to those shown in the embodiment according to FIG. 2 are denoted by the same reference numerals. Therefore, these components are not described again. The same also applies to the following figures.

With the exception of the steam branching component 65 instead of the steam branching component 54, FIG. 6 is identical to FIG. 5. The steam which is to be guided to the reheater 33 of the heat recovery steam generator 32 is now removed via the steam branching component 65 arranged between the saturated steam intermediate pressure steam turbine 4 and the separator 6 in the cross-over line 5.

Unlike in FIG. 5, in the embodiment shown in FIG. 7 all the steam flowing from the saturated steam intermediate pressure steam turbine 4 to the low pressure steam turbine 8 is guided to the heat recovery steam generator 32 downstream of the separator 6, is reheated in the reheater 33 of the heat recovery steam generator 32 and is then fed to the low pressure steam turbine 8 so that the reheater 7 (by flowing steam) is eliminated.

In terms of its circuit design, FIG. 8 substantially corresponds to FIG. 7. However, in this embodiment the gas turbine set 29, 30, 31, 36 and topping steam turbine set 37, 48 form a multishaft power train.

Unlike in FIG. 7, in the embodiment shown in FIG. 9 all the steam flowing from the saturated steam intermediate pressure steam turbine 4 to the low pressure steam turbine 8 is guided to the heat recovery steam generator 32 downstream of the saturated steam intermediate pressure steam turbine 4, is reheated in the reheater 33 of the heat recovery steam generator 32 and is then fed to the low pressure steam turbine 8, so that the separator 6 and the reheater 7 (by flowing steam) are omitted.

In terms of its circuit design, FIG. 10 substantially corresponds to FIG. 9. However, in this embodiment the gas turbine set 29, 30, 31, 36 and topping steam turbine set 37, 48 form a multishaft power train.

The reheating of all the steam flowing from the saturated steam intermediate pressure steam turbine 4 to the low pressure steam turbine 8 in the reheater 33 of the heat recovery steam generator 32 allows the steam branching components 54, 65 and the steam mixing component 53 to be omitted in FIGS. 7 to 10.

In the third variant, shown in FIG. 11, the nuclear steam generation system 1 and the steam turbine set 2 is supplemented with at least one gas turbine set 29, 30, 31, 36, at least one heat recovery steam generator 32 with reheater 33, at least one topping steam turbine 37, comprising a high pressure part 61 and an intermediate pressure part 62, and at least one low pressure steam mixing component 53 upstream of the low pressure steam turbine 8 of the existing steam turbine set 2. The steam generated in the heat recovery steam generator 32 is fed, via the live steam line 43, to the high pressure part 61 of the topping steam turbine 37, is expanded in the high pressure part 61 of the topping steam turbine 37, is fed via the cold reheat line 56 to the reheater 33 of the heat recovery steam generator 32, is reheated in the heat recovery steam generator 32 and is fed, via the hot reheat line 57, to the intermediate pressure part 62 of the topping steam turbine 37. The exhaust steam from the intermediate pressure part 62 of the topping steam turbine 37 is fed via the exhaust steam line 39 to the low pressure steam mixing component 53 upstream of the low pressure steam turbine 8. The topping steam turbine 37, comprising the high pressure part 61 and the intermediate pressure part 62, forms a single shaft power train 35 together with the gas turbine set 29, 30, 31, 36.

In terms of its circuit design, FIG. 12 substantially corresponds to FIG. 11. However, in this embodiment the gas turbine set 29, 30, 31, 36 and topping steam turbine set 37, 48 form a multishaft power train.

In a similar way to FIG. 2, the exhaust steam from the topping steam turbine 37 can also be guided, via the exhaust steam line 39, to an intermediate pressure steam mixing component 52 arranged in the steam line 3.

In order to limit the length of the description, it is not possible to illustrate and describe all possible combinations of the individual variants in the form of figures.

It was stated at the outset that the nuclear steam generation system is supplemented with at least one gas turbine set, at least one heat recovery steam generator, at least one topping steam turbine and at least one steam mixing component.

FIGS. 2 to 12 each show only one gas turbine set with heat recovery steam generator and a topping steam turbine. The possibility that a plurality of units may be present is indicated by the framing of gas turbine set, heat recovery steam generator and topping steam turbine.

FIGS. 13 to 52 show various technical circuit possibilities (embodiments) of a supplemented power plant which contains a plurality of gas turbine sets. Three gas turbine sets are shown as an example in each case.

FIG. 13 shows an embodiment of the variant in accordance with FIG. 2. The three, for example, gas turbine sets 29, 30, 31, 36; 29', 30', 31', 36'; 29", 30", 31", 36", together with the associated heat recovery steam generators 32, 32', 32", are present. The gas turbine sets 29, 30, 31, 36; 29', 30', 31', 36'; 29", 30", 31", 36" together with the topping steam turbines 37, 37', 37" are designed as single shaft power trains 35, 35', 35". The steam generated in the heat recovery steam generators 32, 32', 32" is fed via the live steam lines 43, 43', 43" to three topping steam turbines 37, 37', 37". At their exhaust steam side, the topping steam turbines 37, 37', 37" are connected via the exhaust steam lines 39, 39', 39" to an intermediate pressure common steam range 45. This intermediate pressure common steam range 45 runs to the intermediate pressure steam mixing component 52. The intermediate pressure steam mixing component 52 brings together the steam mass flows coming from the nuclear steam generation system 1 and the intermediate pressure common steam range 45 and thereby acts on the steam turbine set 2 via the steam line 3.

As a distinction from FIG. 13, in FIG. 14 the steam mass flows which have been brought together in the intermediate pressure steam mixing component 52 act on the plurality of steam turbine sets 2, 2', . . . via the steam line 3.

An extended steam line 3 and the presence of more than two steam turbine sets is indicated by the arrow 46.

The embodiment shown in FIG. 15 is constructed on the basis of the embodiment shown in FIGS. 3 and 13. In this embodiment, the steam arriving via the intermediate pressure common steam range 45 is fed to a low pressure steam mixing component 53 inside the steam turbine set 2.

The embodiment shown in FIG. 16 is constructed on the basis of the embodiment shown in FIG. 15. In this embodiment, the steam arriving via the intermediate pressure common steam range 45 is fed to the respective low pressure steam mixing components 53, 53', . . . in side the plurality of steam turbine sets 2, 2', . . . .

The arrows 46 and 67 indicate an extended steam line 3 and an extended intermediate pressure common steam range 45, as well as. the presence of more than two steam turbine sets.

The embodiment shown in FIG. 17 is constructed on the basis of the embodiment shown in FIG. 14. In this embodiment, the steam arriving via the intermediate pressure common steam range 45 is fed to the corresponding intermediate pressure steam mixing components 52, 52', . . . in the steam line 3 immediately upstream of the plurality of steam turbine sets 2, 2', . . . .

The arrows 46 and 67 indicate an extended steam line 3 and an extended intermediate pressure common steam range 45, as well as the presence of more than two steam turbine sets.

In the embodiments shown in FIGS. 13 to 17, the steam from the heat recovery steam generators 32, 32', 32" (in a similar way to FIG. 23) could also initially be combined using a high pressure common steam range 47 and could then be distributed to the topping steam turbines 37, 37', 37".

In general, the specific number of these steam turbine sets 2, 2', . . . depends on the number of steam turbine sets present in the power plant.

The embodiment shown in FIG. 18 is constructed on the basis of the embodiment shown in FIG. 4. Three gas turbine sets 29, 30, 31, 36; 29', 30', 31', 36'; 29", 30", 31", 36", together with the associated heat recovery steam generators 32, 32', 32", are shown. The steam generated in the heat recovery steam generators 32, 32', 32" is fed via the live steam lines 43, 43', 43" to three topping steam turbines 37, 37', 37". The topping steam turbines 37, 37', 37" are separated from the gas turbine sets 29, 30, 31, 36; 29', 30', 31', 36'; 29", 30", 31", 36" and are coupled to in each case their own generator 48, 48', 48". In other words, the gas turbine sets 29, 30, 31, 36; 29', 30', 31', 36'; 29", 30", 31", 36" and the topping steam turbine sets 37, 48; 37', 48'; 37", 48" form multishaft power trains. On the exhaust steam side, the topping steam turbines 37, 37', 37" are connected to the intermediate pressure steam mixing component 52 via the exhaust steam lines 39, 39', 39" and the intermediate pressure common steam range 45. The intermediate pressure steam mixing component 52 brings together the steam mass flows coming from the nuclear steam generation system 1 and the intermediate pressure common steam range 45 and thereby acts on the steam turbine set 2 via the steam line 3.

As a distinction from FIG. 18, in FIG. 19 the steam mass flows which have been brought together in the intermediate pressure steam mixing component 52 act on the plurality of steam turbine sets 2, 2', . . . via the steam line 3.

The arrow 46 indicates an extended steam line 3 and the presence of more than two steam turbine sets.

The embodiment shown in FIG. 20 is constructed on the basis of the embodiment shown in FIGS. 3 and 18. In this embodiment, the steam arriving via the intermediate pressure common steam range 45 is fed to a low pressure steam mixing component 53 inside the steam turbine set 2.

The embodiment shown in FIG. 21 is constructed on the basis of the embodiment shown in FIG. 20. In this embodiment, the steam arriving via the intermediate pressure common steam range 45 is fed to the corresponding low pressure steam mixing components 53, 53', . . . inside the plurality of steam turbine sets 2, 2', . . . .

The arrows 46 and 67 indicate an extended steam line 3 and an extended intermediate pressure common steam range 45, as well as the presence of more than two steam turbine sets.

The embodiment shown in FIG. 22 is constructed on the basis of the embodiment shown in FIG. 19. In this embodiment, the steam arriving via the intermediate pressure common steam range 45 is fed to the respective intermediate pressure steam mixing components 52, 52', . . . in the steam line 3 immediately upstream of the plurality of steam turbine sets 2, 2', . . . .

The arrows 46 and 67 indicate an extended steam line 3 and an extended intermediate pressure common steam range 45, as well as the presence of more than two steam turbine sets.

In the embodiments shown in FIGS. 18 to 22, the steam from the heat recovery steam generators 32, 32', 32" (in a similar manner to FIG. 23) could also initially be brought together by means of a high pressure common steam range 47 and then distributed to the topping steam turbines 37, 37', 37".

The specific number of these steam turbine sets 2, 2', . . . depends on the number of steam turbine sets present in the power plant.

The embodiment shown in FIG. 23 is constructed on the basis of the embodiment shown in FIGS. 4 and 18. Three gas turbine sets 29, 30, 31, 36; 29', 30', 31', 36'; 29", 30", 31", 36", together with the associated heat recovery steam generators 32, 32', 32" are shown. The steam which is generated in the heat recovery steam generators 32, 32', 32" is fed via the live steam lines 43, 43', 43" to a high pressure common steam range 47. In this embodiment, this high pressure common steam range 47 runs to two topping steam turbines 37, 37' with the corresponding generators 48, 48'. On the exhaust steam side, the topping steam turbines 37, 37' are connected, via the exhaust steam lines 39, 39' and the intermediate pressure common steam range 45, to the intermediate pressure steam mixing component 52. The intermediate pressure steam mixing component 52 brings together the steam mass flows coming from the nuclear steam generation system 1 and the intermediate pressure common steam range 45 and thereby acts on the steam turbine set 2 via the steam line 3.

As a distinction from FIG. 23, in FIG. 24 the steam mass flows which have been brought together in the intermediate pressure steam mixing component 52 act on the plurality of steam turbine sets 2, 2', . . . via the steam line 3.

The arrow 46 indicates an extended steam line 3 and the presence of more than two steam turbine sets.

The embodiment shown in FIG. 25 is constructed on the basis of the embodiment shown in FIGS. 3 and 23. In this embodiment, the steam which arrives via the intermediate pressure common steam range 45 is fed to a low pressure steam mixing component 53 inside the steam turbine set 2.

The embodiment shown in FIG. 26 is constructed on the basis of the embodiment shown in FIG. 25. In this embodiment, the steam which arrives via the intermediate pressure common steam range 45 is fed to the respective low pressure steam mixing components 53, 53', . . . inside the plurality of steam turbine sets 2, 2', . . . .

The arrows 46 and 67 indicate an extended steam line 3 and an extended intermediate pressure common steam range 45, as well as the presence of more than two steam turbine sets.

The embodiment shown in FIG. 27 is constructed on the basis of the embodiment shown in FIG. 24. In this embodiment, the steam which arrives via the intermediate pressure common steam range 45 is fed to the corresponding intermediate pressure steam mixing components 52, 52', . . . in the steam line 3 immediately upstream of the plurality of steam turbine sets 2, 2', . . . .

The arrows 46 and 67 indicate an extended steam line 3 and an extended intermediate pressure common steam range 45, as well as the presence of more than two steam turbine sets.

The specific number of these steam turbine sets 2, 2', . . . depends on the number of steam turbine sets present in the power plant.

The embodiment shown in FIG. 28 is constructed on the basis of the embodiment shown in FIGS. 4 and 18. Three gas turbine sets 29, 30, 31, 36; 29', 30', 31', 36'; 29", 30", 31", 36", together with the associated heat recovery steam generators 32, 32', 32", are shown. The steam which is generated in the heat recovery steam generators 32, 32', 32" is fed via the live steam lines 43, 43', 43" to a high pressure common steam range 47. In this embodiment, this high pressure common steam range 47 runs to a single topping steam turbine 37 with generator 48. On the exhaust steam side, the topping steam turbine 37 is connected, via the exhaust steam line 39, to the intermediate pressure steam mixing component 52. The intermediate pressure steam mixing component 52 brings together the steam mass flows coming from the nuclear steam generation system 1 and the exhaust steam line 39 and thereby acts on the steam turbine set 2 via the steam line 3.

As a distinction from FIG. 28, in FIG. 29 the steam mass flows which have been brought together in the intermediate pressure steam mixing component 52 act on the plurality of steam turbine sets 2, 2', . . . via the steam line 3.

The arrow 46 indicates an extended steam line 3 and the presence of more than two steam turbine sets.

The embodiment shown in FIG. 30 is constructed on the basis of the embodiment shown in FIGS. 3 and 28. In this embodiment, the steam which arrives via the exhaust steam line 39 is fed to a low pressure steam mixing component 53 inside the steam turbine set 2.

The embodiment shown in FIG. 31 is constructed on the basis of the embodiment shown in FIG. 30. In this embodiment, the steam which arrives via the exhaust steam line 39 is fed to the respective low pressure steam mixing components 53, 53', . . . inside the plurality of steam turbine sets 2, 2', . . . .

The arrows 46 and 68 indicate an extended steam line 3 and an extended exhaust steam line 39, as well as the presence of more than two steam turbine sets.

The embodiment shown in FIG. 32 is constructed on the basis of the embodiment shown in FIG. 29. In this embodiment, the steam which arrives via the exhaust steam line 39 is fed to the respective intermediate pressure steam mixing components 52, 52', . . . in the steam line 3 immediately upstream of the plurality of steam turbine sets 2, 2', . . . .

The arrows 46 and 68 indicate an extended steam line 3 and an extended exhaust steam line 39, as well as the presence of more than two steam turbine sets.

The specific number of these steam turbine sets 2, 2', . . . depends on the number of steam turbine sets present in the power plant.

Alternatively, it is also possible to provide three or more topping steam turbines with generator. By way of example, a supplemented power plant could have six gas turbine sets with six heat recovery steam generators, in each case two heat recovery steam generators being connected, on the exhaust steam side, to a common steam range, so that six gas turbine sets are combined with three topping steam turbines, each with a generator. This arrangement could be selected, for example, if the supplemented power plant has three steam turbine sets.

The embodiment shown in FIG. 33 is constructed on the basis of the embodiment shown in FIGS. 5 and 6. Three gas turbine sets 29, 30, 31, 36; 29', 30', 31', 36'; 29", 30", 31", 36", together with the associated heat recovery steam generators 32, 32', 32", are shown. The heat recovery steam generators 32, 32', 32" have reheaters 33, 33', 33". The steam which is generated in the heat recovery steam generators 32, 32', 32" is fed via the live steam lines 43, 43', 43" to three topping steam turbines 37, 37', 37". The gas turbine sets 29, 30, 31, 36; 29', 30', 31', 36'; 29", 30", 31", 36", together with the topping steam turbines 37, 37', 37", are designed as single shaft power trains 35, 35', 35". On the exhaust steam side, the topping steam turbines 37, 37', 37" are connected, via the exhaust steam lines 39, 39', 39", to an intermediate pressure common steam range 45. This intermediate pressure common steam range 45 runs to the intermediate pressure steam mixing component 52. The intermediate pressure steam mixing component 52 brings together the steam mass flows coming from the nuclear steam generation system 1 and the intermediate pressure common steam range 45 and thereby acts on the steam turbine set 2 via the steam line 3.

Inside the steam turbine set 2, the steam is removed from the steam turbine set 2 via a steam branching component 54, 65 and is guided via a cold reheat common steam range 58 and the cold reheat lines 56, 56', 56" to the reheaters 33, 33', 33" of the respective heat recovery steam generators 32, 32', 32". After reheating has taken place, the steam returns, via the hot reheat lines 57, 57', 57", the hot reheat common steam range 34 and the low pressure steam mixing component 53, to the steam turbine set 2.

As a distinction from FIG. 33, in FIG. 34 the steam mass flows which have been brought together in the intermediate pressure steam mixing component 52 act on the plurality of steam turbine sets 2, 2', . . . via the steam line 3, and the steam mass flow arriving via the hot reheat common steam range 34 acts on the plurality of steam turbine sets 2, 2', . . . via the low pressure steam mixing components 53, 53', . . . .

The arrows 46 and 69 indicate an extended steam line 3 and an extended hot reheat common steam range 34, as well as the presence of more than two steam turbine sets.

Furthermore, the reheaters 33, 33', 33" of the heat recovery steam generators 32, 32', 32" are acted on via the cold reheat common steam range 58, likewise from the steam branching components 54, 65; 54', 65' of the plurality of steam turbine sets 2, 2', . . . .

The embodiment shown in FIG. 35 is constructed on the basis of the embodiment shown in FIG. 34. In this embodiment, the steam which arrives via the steam line 3 and the intermediate pressure common steam range 45 is fed to the respective intermediate pressure steam mixing components 52, 52', . . . in the steam line 3 immediately upstream of the plurality of steam turbine units 2, 2', . . . .

The arrows 46, 67 and 69 indicate an extended steam line 3, an extended intermediate pressure common steam range 45 and an extended hot reheat common steam range 34, as well as the presence of more than two steam turbine sets.

The specific number of these steam turbine sets 2, 2', . . . depends on the number of steam turbine sets present in the power plant.

In the embodiments shown in FIGS. 33 to 35, the steam from the heat recovery steam generators 32, 32', 32" could also initially be brought together via a high pressure common steam range 47 and then distributed to the topping steam turbines 37, 37', 37".

The embodiment shown in FIG. 36 is constructed on the basis of the embodiment shown in FIG. 33. Three gas turbine sets 29, 30, 31, 36; 29', 30', 31', 36'; 29", 30", 31", 36", together with the associated heat recovery steam generators 32, 32', 32", are shown. The heat recovery steam generators 32, 32', 32" have reheaters 33, 33', 33". The steam which is generated in the heat recovery steam generators 32, 32', 32" is fed via the live steam lines 43, 43', 43" to three topping steam turbines 37, 37', 37". The topping steam turbines 37, 37', 37" are separated from the gas turbine sets 29, 30, 31, 36; 29', 30', 31', 36'; 29", 30", 31", 36" and are coupled to in each case their own generator 48, 48', 48". This means that the gas turbine sets 29, 30, 31, 36; 29', 30', 31', 36'; 29", 30", 31", 36" and the topping steam turbine sets 37, 48; 37', 48'; 37", 48" form multishaft power trains. On the exhaust steam side, the topping steam turbines 37, 37', 37" are connected to an intermediate pressure common steam range 45 via the exhaust steam lines 39, 39', 39". This intermediate pressure common steam range 45 runs to the intermediate pressure steam mixing component 52. The intermediate pressure steam mixing component 52 brings together the steam mass flows coming from the nuclear steam generation system 1 and the intermediate pressure common steam range 45 and thereby acts on the steam turbine set 2 via the steam line 3.

Inside the steam turbine set 2, the steam is removed from the steam turbine set 2 via a steam branching component 54, 65 and is guided, via a cold reheat common steam range 58 and the cold reheat lines 56, 56', 56", to the reheaters 33, 33', 33" of the respective heat recovery steam generators 32, 32', 32". After reheating has taken place, the steam returns, via the hot reheat lines 57, 57', 57", the hot reheat common steam range 34 and the low pressure steam mixing component 53, to the steam turbine set 2.

As a distinction from FIG. 36, in FIG. 37 the steam mass flows which have been brought together in the intermediate pressure steam mixing component 52 act on the plurality of steam turbine sets 2, 2', . . . via the steam line 3, and the steam mass flow arriving via the hot reheat common steam range 34 acts on the plurality of steam turbine sets 2, 2', . . . via the low pressure steam mixing components 53, 53', . . . .

The arrows 46 and 69 indicate an extended steam line 3 and an extended hot reheat common steam range 34, as well as the presence of more than two steam turbine sets.

Furthermore, the reheaters 33, 33', 33" of the heat recovery steam generators 32, 32 ', 32" are acted on via the cold reheat common steam range 58, likewise from the steam branching components 54, 65; 54', 65' of the plurality of steam turbine sets 2, 2', . . . .

The embodiment shown in FIG. 38 is constructed on the basis of the embodiment shown in FIG. 37. In this embodiment, the steam arriving via the steam line 3 and the intermediate pressure common steam range 45 is fed to the respective intermediate pressure steam mixing components 52, 52', . . . in the steam line 3 immediately upstream of the plurality of steam turbine sets 2, 2', . . . .

The arrows 46, 67 and 69 indicate an extended steam line 3, an extended intermediate pressure common steam range 45 and an extended hot reheat common steam range 34, as well as the presence of more than two steam turbine sets.

The specific number of these steam turbine sets 2, 2', . . . depends on the number of steam turbine sets present in the power plant.

In the embodiments shown in FIGS. 36 to 38, the steam from the heat recovery steam generators 32, 32', 32" could also initially be brought together via a high pressure common steam range 47 and then distributed to the topping steam turbines 37, 37', 37".

The embodiment shown in FIG. 39 is constructed on the basis of the embodiment shown in FIG. 36. Three gas turbine sets 29, 30, 31, 36; 29', 30', 31', 36'; 29", 30", 31", 36", together with the associated heat recovery steam generators 32, 32', 32", are shown. The heat recovery steam generators 32, 32', 32" have reheaters 33, 33', 33". The steam which is generated in the heat recovery steam generators 32, 32', 32" is fed via the live steam lines 43, 43', 43" to a high pressure common steam range 47. In this embodiment, this high pressure common steam range 47 runs to two topping steam turbines 37, 37'. On the exhaust steam side, the topping steam turbines 37, 37' are connected, via the exhaust steam lines 39, 39' and the intermediate pressure common steam range 45, to the intermediate pressure steam mixing component 52. The intermediate pressure steam mixing component 52 brings together the steam mass flows coming from the nuclear steam generation system 1 and the intermediate pressure common steam range 45 and thereby acts on the steam turbine set 2 via the steam line 3.

Inside the steam turbine set 2, the steam is removed from the steam turbine set 2 via a steam branching component 54, 65 and is guided, via a cold reheat common steam range 58 and the cold reheat lines 56, 56', 56" to the reheaters 33, 33', 33" of the respective heat recovery steam generators 32, 32', 32". After reheating has taken place, the steam returns, via the hot reheat lines 57, 57', 57", the hot reheat common steam range 34 and the low pressure steam mixing component 53, to the steam turbine set 2.

As a distinction from FIG. 39, in FIG. 40 the steam mass flows which have been brought together in the intermediate pressure steam mixing component 52 act on the plurality of steam turbine sets 2, 2', . . . via the steam line 3, and the steam mass flow arriving via the hot reheat common steam range 34 acts on the plurality of steam turbine sets 2, 2', . . . via the low pressure steam mixing components 53, 53', . . . .

The arrows 46 and 69 indicate an extended steam line 3 and an extended hot reheat common steam range 34, as well as the presence of more than two steam turbine sets.

Furthermore, the reheaters 33, 33', 33" of the heat recovery steam generators 32, 32', 32" are acted on via the cold reheat common steam range 58, likewise from the steam branching components 54, 65; 54', 65' of the plurality of steam turbine sets 2, 2', . . . .

The embodiment shown in FIG. 41 is constructed on the basis of the embodiment shown in FIG. 40. In this embodiment, the steam which arrives via the steam line 3 and the intermediate pressure common steam range 45 is fed to the respective intermediate pressure steam mixing components 52, 52', . . . in the steam line 3 immediately upstream of the plurality of steam turbine sets 2, 2', . . . .

The arrows 46, 67, and 69 indicate an extended steam line 3, an extended intermediate pressure common steam range 45 and. an extended hot reheat common steam range 34, as well as the presence of more than two steam turbine sets.

The specific number of these steam turbine sets 2, 2', . . . depends on the number of steam turbine sets present in the power plant.

The embodiment shown in FIG. 42 is constructed on the basis of the embodiment shown in FIG. 39. Three gas turbine sets 29, 30, 31, 36; 29', 30', 31', 36'; 29", 30", 31", 36", together with the associated heat recovery steam generators 32, 32', 32", are shown. The heat recovery steam generators 32, 32', 32" have reheaters 33, 33', 33". The steam which is generated in the heat recovery steam generators 32, 32', 32" is fed via the live steam lines 43, 43', 43" to a high pressure common steam range 47. In this embodiment, this high pressure common steam range 47 runs to a single topping steam turbine 37 with generator 48. On the exhaust steam side, the topping steam turbine 37 is connected to the intermediate pressure steam mixing component 52 via the exhaust steam line 39. The intermediate pressure steam mixing component 52 brings together the steam mass flows coming from the nuclear steam generation system 1 and the exhaust steam line 39 and thereby acts on the steam turbine set 2 via the steam line 3.

Inside the steam turbine set 2, the steam is removed from the steam turbine set 2 via a steam branching component 54, 65 and is guided, via a cold reheat common steam range 58 and the cold reheat lines 56, 56', 56" to the reheaters 33, 33', 33" of the respective heat recovery steam generators 32, 32', 32". After reheating has taken place, the steam returns, via the hot reheat lines 57, 57', 57", the hot reheat common steam range 34 and the low pressure steam mixing component 53, to the steam turbine set 2.

As a distinction from FIG. 42, in FIG. 43 the steam mass flows which are brought together in the intermediate pressure steam mixing component 52 act on the plurality of steam turbine sets 2, 2', . . . via the steam line 3, and the steam mass flow which arrives via the hot reheat common steam range 34 acts on the plurality of steam turbine sets 2, 2', . . . via the low pressure steam mixing components 53, 53', . . . .

The arrows 46 and 69 indicate an extended steam line 3 and an extended hot reheat common steam range 34, as well as the presence of more than two steam turbine sets.

Furthermore, the reheaters 33, 33', 33" of the heat recovery steam generators 32, 32', 32" are acted on via the cold reheat common steam range 58, likewise from the steam branching components 54, 65; 54', 65' of the plurality of steam turbine sets 2, 2', . . . .

The embodiment shown in FIG. 44 is constructed on the basis of the embodiment shown in FIG. 43. In this embodiment, the steam which arrives via the steam line 3 and the exhaust steam line 39 is fed to the respective intermediate pressure steam mixing components 52, 52', . . . in the steam line 3 immediately upstream of the plurality of steam turbine sets 2, 2', . . . .

The arrows 46, 68 and 69 indicate an extended steam line 3, an extended exhaust steam line 39 and an extended hot reheat common steam range 34, as well as the presence of more than two steam turbine sets.

The specific number of these steam turbine sets 2, 2', . . . depends on the number of steam turbine sets present in the power plant.

If the steam is completely reheated between saturated steam intermediate pressure steam turbine 4 and low pressure steam turbine 8 of the steam turbine set 2 in accordance with FIGS. 7 to 10, the steam branching component 54, 65; 54', 65' and the low pressure steam mixing component 53, 53' can be omitted in FIGS. 33 to 44.

The embodiment shown in FIG. 45 is constructed on the basis of the embodiment shown in FIG. 11. Three gas turbine sets 29, 30, 31, 36; 29', 30', 31', 36'; 29", 30", 31", 36", together with the associated heat recovery steam generators 32, 32', 32", are shown. The heat recovery steam generators 32, 32', 32" have reheaters 33, 33', 33". The steam which is generated in the heat recovery steam generators 32, 32', 32" is fed via the live steam lines 43, 43', 43" to the high pressure parts 61, 61 ', 61" of the three topping steam turbines 37, 37 ', 37". The gas turbine sets 29, 30, 31, 36; 29', 30', 31', 36'; 29", 30", 31", 36", together with the topping steam turbines 37, 37', 37", are designed as single shaft power trains 35, 35', 35". On the exhaust steam side, the high pressure parts 61, 61', 61" of the topping steam turbines 37, 37', 37" are connected, via the cold reheat lines 56, 56', 56", to the reheaters 33, 33', 33" of the heat recovery steam generators 32, 32', 32". From the reheater 33, 33', 33" the steam is guided via the hot reheat lines 57, 57', 57" to the intermediate pressure parts 62, 62', 62" of the topping steam turbines 37, 37', 37". From the intermediate pressure parts 62, 62', 62" of the topping steam turbines 37, 37', 37", the steam is guided, via the exhaust steam lines 39, 39', 39" and the low pressure common steam range 60, to the low pressure steam mixing component 53 inside the steam turbine set 2.

As a distinction from FIG. 45, in FIG. 46 the steam mass flow arriving via the steam line 3 and the steam mass flow arriving via the low pressure common steam range 60 act on the plurality of steam turbine sets 2, 2', . . . via the low pressure steam mixing components 53, 53', . . . .

The arrows 46 and 70 indicate an extended steam line 3 and an extended low pressure common steam range 60, as well as the presence of more than two steam turbine sets.

In the embodiments shown in FIGS. 45 and 46, the steam from the heat recovery steam generators 32, 32', 32" could also initially be brought together via a high pressure common steam range 47 and then distributed to the topping steam turbines 37, 37', 37", and furthermore the exhaust steam from the high pressure parts 61, 61', 61" of the topping steam turbines 37, 37', 37" could be brought together via a cold reheat common steam range 58 and then distributed to the reheaters 33, 33', 33" of the heat recovery steam generators 32, 32', 32", and finally the reheated steam could be brought together in a hot reheat common steam range 34 and then distributed to the intermediate pressure parts 62, 62', 62" of the topping steam turbines 37, 37', 37".

The embodiment shown in FIG. 47 is constructed on the basis of the embodiment shown in FIG. 45. Three gas turbine sets 29, 30, 31, 36; 29', 30', 31', 36'; 29", 30", 31", 36", together with the associated heat recovery steam generators 32, 32', 32", are shown. The heat recovery steam generators 32, 32', 32" have reheaters 33, 33', 33". The steam which is generated in the heat recovery steam generators 32, 32', 32" is fed via the live steam lines 43, 43', 43" to the high pressure parts 61, 61', 61" of the three topping steam turbines 37, 37', 37". The topping steam turbines 37, 37', 37" are separated from the gas turbine sets 29, 30, 31, 36; 29', 30', 31', 36'; 29", 30", 31", 36" and are each coupled to their own generator 48, 48', 48". This means that the gas turbine sets 29, 30, 31, 36; 29', 30', 31', 36'; 29", 30", 31", 36" and the topping steam turbine sets 37, 48; 37', 48'; 37", 48" form multishaft power trains. On the exhaust steam side, the high pressure parts 61, 61', 61" of the topping steam turbines 37, 37', 37" are connected, via the cold reheat lines 56, 56', 56", to the reheaters 33, 33', 33" of the heat recovery steam generators 32, 32', 32". From the reheater 33, 33', 33", the steam is guided, via the hot reheat lines 57, 57', 57", to the intermediate pressure parts 62, 62', 62" of the topping steam turbines 37, 37', 37". From the intermediate pressure. parts 62, 62', 62" of the topping steam turbines 37, 37', 37", the steam is guided, via the exhaust steam lines 39, 39', 39" and the low pressure common steam range 60, to the low pressure steam mixing component 53 inside the steam turbine set 2.

As a distinction from FIG. 47, in FIG. 48 the steam mass flow arriving via the steam line 3 and the steam mass flow arriving via the low pressure common steam range 60 act on the plurality of steam turbine sets 2, 2', . . . via the low pressure steam mixing components 53, 53', . . . .

The arrows 46 and 70 indicate an extended steam line 3 and an extended low pressure common steam range 60, as well as the presence of more than two steam turbine sets.

In the embodiments shown in FIGS. 47 and 48, the steam from the heat recovery steam generators 32, 32', 32" could also initially be brought together via a high pressure common steam range 47 and then distributed to the topping steam turbines 37, 37', 37", and furthermore the exhaust steam from the high pressure parts 61, 61', 61" of the topping steam turbines 37, 37', 37" could be brought together via a cold reheat common steam range 58 and then distributed to the reheaters 33, 33', 33" of the heat recovery steam generators 32, 32', 32", and finally the reheated steam could be brought together in a hot reheat common steam range 34 and then distributed to the intermediate pressure parts 62, 62', 62" of the topping steam turbines 37, 37', 37".

The embodiment shown in FIG. 49 is constructed on the basis of the embodiment shown in FIG. 47. Three gas turbine sets 29, 30, 31, 36; 29', 30', 31', 36'; 29", 30", 31", 36", together with the associated heat recovery steam generators 32, 32', 32", are shown. The heat recovery steam generators 32, 32', 32" have reheaters 33, 33', 33". The steam which is generated in the heat recovery steam generators 32, 32', 32" is guided via the live steam lines 43, 43', 43" and the high pressure common steam range 47 to the two high pressure parts 61, 61' of the two topping steam turbines 37, 37'. On the exhaust steam side, the two high pressure parts 61, 61' of the two topping steam turbines 37, 37' are connected, via the cold reheat common steam range 58 and the cold reheat lines 56, 56', 56", to the reheaters 33, 33', 33" of the heat recovery steam generators 32, 32', 32". From the reheater 33, 33', 33", the steam is guided, via the hot reheat lines 57, 57', 57" and the hot reheat common steam range 34, to the two intermediate pressure parts 62, 62' of the two topping steam turbines 37, 37'. From the two intermediate pressure parts 62, 62' of the two topping steam turbines 37, 37', the steam is guided, via the exhaust steam lines 39, 39' and the low pressure common steam range 60, to the low pressure steam mixing component 53 inside the steam turbine set 2.

As a distinction from FIG. 49, in FIG. 50 the steam mass flow which arrives via the steam line 3 and the steam mass flow which arrives via the low pressure common steam range 60 act on the plurality of steam turbine sets 2, 2', . . . via the low pressure steam mixing components 53, 53', . . . .

The arrows 46 and 70 indicate an extended steam line 3 and an extended low pressure common steam range 60, as well as the presence of more than two steam turbine sets.

The embodiment shown in FIG. 51 is constructed on the basis of the embodiment shown in FIG. 49. Three gas turbine sets 29, 30, 31, 36; 29', 30', 31', 36'; 29", 30", 31", 36", together with the associated heat recovery steam generators 32, 32', 32", are shown. The heat recovery steam generators 32, 32', 32" have reheaters 33, 33', 33". The steam which is generated in the heat recovery steam generators 32, 32', 32" is fed via the live steam lines 43, 43', 43" and the high pressure common steam range 47 to the high pressure part 61 of a single topping steam turbine 37. On the exhaust steam side, the high pressure part 61 of the topping steam turbine 37 is connected, via the cold reheat common steam range 58 and the cold reheat lines 56, 56', 56", to the reheaters 33, 33', 33" of the heat recovery steam generators 32, 32', 32". From the reheater 33, 33', 33", the steam is guided, via the hot reheat lines 57, 57', 57" and the hot reheat common steam range 34, to the intermediate pressure part 62 of the single topping steam turbine 37. From the intermediate pressure part 62 of the single topping steam turbine 37, the steam is guided, via the exhaust steam line 39, to the low pressure steam mixing component 53 inside the steam turbine set 2.

As a distinction from FIG. 51, in FIG. 52 the steam mass flow which arrives via the steam line 3 and the steam mass flow which arrives via the exhaust steam line 39 act on the plurality of steam turbine sets 2, 2', . . . via the low pressure steam mixing components 53, 53', . . . .

The arrows 46 and 68 indicate an extended steam line 3 and an extended exhaust steam line 39, as well as the presence of more than two steam turbine sets.

It is obvious that a large number of possibilities can be implemented as a combination of the variants illustrated. Which variant is ultimately selected depends, inter alia, on the steam turbine sets which are present, on economic considerations and on the structure of the existing power plant.

The invention is not, of course, limited to the exemplary embodiments described. For example, individual steam lines can also be provided between the respective power plant components, instead of the high pressure common steam range 47,
the intermediate pressure common steam range 45,
the hot reheat common steam range 34,
the cold reheat common steam range 58, or
the low pressure common steam range 60.

List of Designations

1 Saturated steam generation system (saturated steam boiler, nuclear steam generation system)
2,2' Steam turbine set (consisting of 4, 5, 6, 7, 8; 4', 5', 6', 7', 8')
3 Steam line
4,4' Saturated steam intermediate pressure steam turbine
5,5' Cross-over line
6,6' Separator (moisture separator)
7,7' Reheater (by flowing steam)
8,8' Low pressure steam turbine
9 Branch steam line
10,10' Generator
11 Condenser
12 Hotwell
13 Condensate pump
14 Condensate line
15 LP-feedwater heater
16 LP-feedwater heater
17 LP-feedwater heater
18,18' Bleed steam line
19,19' Bleed steam line
20,20' Bleed steam line
21 Feedwater tank/deaerator
22 HP-feedwater pump
23 HP-feedwater heater
24 HP-feedwater heater
25 HP-feedwater heater
26,26' Bleed steam line
27,27' Bleed steam line
28,28' Bleed steam line
29,29',29" Compressor
30,30',30" Combustion chamber
31,31',31" Gas turbine
32 32',32" Heat recovery steam generator (HRSG)
33,33',33' Reheater (of HRSG 32,32',32")
34 Hot reheat common steam range
35,35',35" Single shaft power train
36,36',36" Generator
37,37',37" Topping steam turbine
38,38' Exhaust steam line (from 8,8')
39,39',39" Exhaust steam line (from 37,37',37")
41 Interface water/steam cycle
42,42',42" Feedwater line (to 32,32',32")
43,43',43" Live steam line
44,44' Bleed steam line
45 Intermediate pressure common steam range
46 Arrow (of steam line 3)
47 High pressure common steam range
48,48',48" Generator (of topping steam turbine 37,37',37")
50,50' Condensate line (from separator 6,6')
51,51' Condensate line (from reheater 7,7')
52,52' Intermediate pressure steam mixing component
53,53' Low pressure steam mixing component
54,54' Steam branching component
55 Feedwater line (to saturated steam generation system 1)
56,56',56" Cold reheat line
57,57',57" Hot reheat line
58 Cold reheat common steam range
60 Low pressure common steam range
61,61',61" High pressure part (topping steam turbine 37, 37',37")
62,62',62" Intermediate pressure part (topping steam turbine 37,37',37")
63,63' Bleed steam lines 26, 27, 28, 44; 26',27',28',44' (from 4,4')
64,64' Bleed steam lines 18,19,20; 18',19',20' (from 8,8')
65,65' Steam branching component
66' Lines from steam turbine set 2,2' to water/steam cycle 38,50,51,18,19,20,26,27,28,44  38',50',51',18',19',20',26', 27',28',44'
67 Arrow (of intermediate pressure common steam range 45)
68 Arrow (of exhaust steam line 39)
69 Arrow (of hot reheat common steam range 34)
70 Arrow (of low pressure common steam range 60)

What is claimed is:

1. A method for supplementing a steam power plant having a saturated steam generation system and at least one steam turbine set which is supplied with steam by this system, wherein the saturated steam generation system is supplemented with at least one gas turbine set, at least one heat recovery steam generator, at least one topping steam turbine and at least one steam mixing component, the exhaust gas from at least one gas turbine of the at least one gas turbine set is utilized for steam generation in the at least one heat recovery steam generator, the steam which is generated in the at least one heat recovery steam generator is fed via a live steam line to the at least one topping steam turbine, and the exhaust steam from the at least one topping steam turbine is fed via an exhaust steam line to the at least one steam mixing component, in which at least one steam mixing component steam originating from the saturated steam generation system is mixed with steam originating from the at least one topping steam turbine, and the steam mixture is provided to the at least one steam turbine set, the at least one steam turbine set has a saturated steam intermediate pressure steam turbine, a separator, a reheater and a low pressure steam turbine, wherein the at least one heat recovery steam generator has a reheater, in that the exhaust steam from the at least one saturated steam intermediate pressure steam turbine is at least in part reheated on a mass flow side in the reheater of the at least one heat recovery steam generator, and the reheated steam is provided to the at least one steam turbine set, wherein a first steam mixing component is fitted between the saturated steam generation system and the at least one saturated steam intermediate pressure steam turbine, and a second steam mixing component is fitted between the reheater and the low pressure steam turbine of the at least one steam turbine set, in that steam flowing in from the saturated steam generation system is mixed with steam flowing in from the at least one topping steam turbine in the first steam mixing component, and the steam which has been reheated in the reheater of the at least one heat recovery steam generator is mixed with the steam flowing in from the reheater of the at least one steam turbine set in the second steam mixing component, and this steam mixture is provided to the low pressure steam turbine.

2. The method as claimed in claim 1, wherein the steam which is fed to the reheater of the at least one heat recovery steam generator is branched off between the separator and the reheater of the at least one steam turbine set.

3. the method as claimed in claim 1, wherein the steam which is fed to the reheater of the at least one heat recovery steam generator is branched off between the saturated steam intermediate pressure steam turbine and the separator of the at least one steam turbine set.

* * * * *